United States Patent
Sun

(10) Patent No.: US 8,328,365 B2
(45) Date of Patent: Dec. 11, 2012

(54) MESH FOR MAPPING DOMAINS BASED ON REGULARIZED FIDUCIAL MARKS

(75) Inventor: Wei Sun, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 751 days.

(21) Appl. No.: 12/433,565

(22) Filed: Apr. 30, 2009

(65) Prior Publication Data

US 2010/0277655 A1    Nov. 4, 2010

(51) Int. Cl.
G03B 21/14    (2006.01)
G03B 21/26    (2006.01)

(52) U.S. Cl. .......................................... 353/69; 353/94

(58) Field of Classification Search .............. 353/69–70, 353/94, 122; 382/264; 345/611
See application file for complete search history.

(56) References Cited

U.S. PATENT DOCUMENTS

| | | | |
|---|---|---|---|
| 4,373,784 A | 2/1983 | Nonomura et al. |
| 4,662,746 A | 5/1987 | Hornbeck |
| 4,811,003 A | 3/1989 | Strathman et al. |
| 4,956,619 A | 9/1990 | Hornbeck |
| 5,061,049 A | 10/1991 | Hornbeck |
| 5,083,857 A | 1/1992 | Hornbeck |
| 5,146,356 A | 9/1992 | Carlson |
| 5,309,241 A | 5/1994 | Hoagland |
| 5,317,409 A | 5/1994 | Macocs |
| 5,319,744 A | 6/1994 | Kelly et al. |
| 5,369,450 A | 11/1994 | Haseltine et al. |
| 5,369,739 A | 11/1994 | Akeley |
| 5,386,253 A | 1/1995 | Fielding |
| 5,402,184 A | 3/1995 | O'Grady et al. |
| 5,409,009 A | 4/1995 | Olson |
| 5,490,009 A | 2/1996 | Venkateswar et al. |
| 5,557,353 A | 9/1996 | Stahl |
| 5,689,283 A | 11/1997 | Shirochi |
| 5,751,379 A | 5/1998 | Markandey et al. |
| 5,842,762 A | 12/1998 | Clarke |
| 5,889,625 A | 3/1999 | Chen et al. |
| 5,897,191 A | 4/1999 | Clarke |
| 5,912,773 A | 6/1999 | Barnett et al. |

(Continued)

FOREIGN PATENT DOCUMENTS

EP    1001306 A2    5/2000

(Continued)

OTHER PUBLICATIONS

Plass, M., & Stone, M. (1983). Curve-fitting with piecewise parametric cubics. ACM SIGGRAPH Computer Graphics, 17(3), 229239. ACM Press. Retrieved from http://portal.acm.org/citation.cfm?doid=964967.801153.*

(Continued)

Primary Examiner — Georgia Y Epps
Assistant Examiner — Jori S Reilly-Diakun

(57) ABSTRACT

A method includes capturing a first image of a display surface with an image capture device, the display surface having a first plurality of fiducial marks. A first smoothing function is performed on fiducial marks appearing in the first image, thereby generating a first regularized set of fiducial marks having a smooth variation in spacing between adjacent fiducial marks. A first plurality of meshes is generated based on the first regularized set of fiducial marks. The first plurality of meshes is configured to map a first domain associated with the display surface to a second domain associated with the image capture device.

19 Claims, 11 Drawing Sheets

U.S. PATENT DOCUMENTS

| | | | |
|---|---|---|---|
| 5,920,365 A | 7/1999 | Eriksson | |
| 5,953,148 A | 9/1999 | Moseley et al. | |
| H1812 H | 11/1999 | Arcuri | |
| 5,978,518 A | 11/1999 | Oliyide et al. | |
| 6,017,123 A | 1/2000 | Bleha et al. | |
| 6,025,951 A | 2/2000 | Swart et al. | |
| 6,067,143 A | 5/2000 | Tomita | |
| 6,097,854 A | 8/2000 | Szeliski et al. | |
| 6,104,375 A | 8/2000 | Lam | |
| 6,115,022 A | 9/2000 | Mayer, III et al. | |
| 6,118,584 A | 9/2000 | Van Berkel et al. | |
| 6,141,039 A | 10/2000 | Poetsch | |
| 6,184,969 B1 | 2/2001 | Fergason | |
| 6,219,017 B1 | 4/2001 | Shimada et al. | |
| 6,222,593 B1 | 4/2001 | Higurashi et al. | |
| 6,239,783 B1 | 5/2001 | Hill et al. | |
| 6,243,055 B1 | 6/2001 | Fergason | |
| 6,249,289 B1 | 6/2001 | Arnaud et al. | |
| 6,304,677 B1* | 10/2001 | Schuster | 382/264 |
| 6,313,888 B1 | 11/2001 | Tabata | |
| 6,317,171 B1 | 11/2001 | Dewald | |
| 6,319,744 B1 | 11/2001 | Hoon et al. | |
| 6,384,816 B1 | 5/2002 | Tabata | |
| 6,390,050 B2 | 5/2002 | Feikus | |
| 6,393,145 B2 | 5/2002 | Betrisey et al. | |
| 6,456,339 B1 | 9/2002 | Surati et al. | |
| 6,522,356 B1 | 2/2003 | Watanabe | |
| 6,536,907 B1 | 3/2003 | Towner et al. | |
| 6,558,006 B2 | 5/2003 | Ioka | |
| 6,657,603 B1 | 12/2003 | Demetrescu et al. | |
| 6,677,956 B2 | 1/2004 | Raskar et al. | |
| 6,695,451 B1 | 2/2004 | Yamasaki et al. | |
| 6,697,522 B1 | 2/2004 | Ishikawa | |
| 6,709,116 B1 | 3/2004 | Raskar et al. | |
| 6,729,733 B1 | 5/2004 | Raskar et al. | |
| 6,733,136 B2 | 5/2004 | Lantz et al. | |
| 6,755,537 B1 | 6/2004 | Raskar et al. | |
| 6,793,350 B1 | 9/2004 | Raskar et al. | |
| 6,811,264 B2 | 11/2004 | Raskar et al. | |
| 6,814,448 B2 | 11/2004 | Ioka | |
| 6,824,271 B2 | 11/2004 | Ishii et al. | |
| 6,834,965 B2 | 12/2004 | Raskar et al. | |
| 6,856,420 B1 | 2/2005 | Pew et al. | |
| 6,874,420 B2 | 4/2005 | Lewis, Jr. et al. | |
| 6,912,293 B1 | 6/2005 | Korobkin | |
| 6,930,681 B2 | 8/2005 | Raskar et al. | |
| 6,952,204 B2 | 10/2005 | Baumberg et al. | |
| 6,963,348 B2 | 11/2005 | Diamond et al. | |
| 7,006,110 B2 | 2/2006 | Crisu et al. | |
| 7,019,713 B2 | 3/2006 | Hereld et al. | |
| 7,031,512 B2 | 4/2006 | Ng | |
| 7,038,712 B1 | 5/2006 | Livingston et al. | |
| 7,038,727 B2 | 5/2006 | Majumder et al. | |
| 7,103,203 B2 | 9/2006 | Deschamps | |
| 7,131,733 B2 | 11/2006 | Shibano | |
| 7,145,726 B2 | 12/2006 | Geist | |
| 7,156,521 B2 | 1/2007 | Kawai et al. | |
| 7,224,526 B2 | 5/2007 | Putilin et al. | |
| 7,239,360 B2 | 7/2007 | Bassi et al. | |
| 7,308,157 B2 | 12/2007 | Safaee-Rad et al. | |
| 7,339,625 B2 | 3/2008 | Matthys et al. | |
| 7,589,729 B2 | 9/2009 | Skibak et al. | |
| 7,854,518 B2 | 12/2010 | Culbertson et al. | |
| 2001/0055025 A1 | 12/2001 | Deering et al. | |
| 2002/0024640 A1 | 2/2002 | Ioka | |
| 2002/0041364 A1 | 4/2002 | Ioka | |
| 2002/0057278 A1 | 5/2002 | Bruderlin | |
| 2003/0020809 A1 | 1/2003 | Gibbon et al. | |
| 2003/0034974 A1 | 2/2003 | Welch et al. | |
| 2003/0038818 A1 | 2/2003 | Tidwell | |
| 2003/0076325 A1 | 4/2003 | Thrasher | |
| 2003/0090597 A1 | 5/2003 | Katoh et al. | |
| 2004/0017164 A1 | 1/2004 | Belliveau | |
| 2004/0076336 A1 | 4/2004 | Bassi et al. | |
| 2004/0085477 A1 | 5/2004 | Majumder et al. | |
| 2004/0109599 A1* | 6/2004 | Cho et al. | 382/145 |
| 2004/0169827 A1 | 9/2004 | Kubo et al. | |
| 2004/0184010 A1 | 9/2004 | Raskar et al. | |
| 2004/0184011 A1 | 9/2004 | Raskar et al. | |
| 2004/0184013 A1 | 9/2004 | Raskar et al. | |
| 2004/0218071 A1 | 11/2004 | Chauville et al. | |
| 2004/0239885 A1 | 12/2004 | Jaynes et al. | |
| 2004/0239890 A1 | 12/2004 | Starkweather | |
| 2004/0257540 A1 | 12/2004 | Roy et al. | |
| 2005/0012474 A1 | 1/2005 | Belliveau | |
| 2005/0052623 A1 | 3/2005 | Hsiung | |
| 2005/0078378 A1 | 4/2005 | Geist | |
| 2005/0089213 A1* | 4/2005 | Geng | 382/154 |
| 2005/0117215 A1 | 6/2005 | Lange | |
| 2005/0213057 A1 | 9/2005 | Nakayama | |
| 2005/0271299 A1 | 12/2005 | Ajito et al. | |
| 2006/0001543 A1* | 1/2006 | Raskar et al. | 340/572.1 |
| 2006/0197915 A1 | 9/2006 | Kobayashi | |
| 2006/0227301 A1 | 10/2006 | Matthys et al. | |
| 2006/0239549 A1 | 10/2006 | Kelly et al. | |
| 2006/0244930 A1 | 11/2006 | Hayashi et al. | |
| 2006/0270932 A1* | 11/2006 | Aharon et al. | 600/421 |
| 2007/0024620 A1 | 2/2007 | Muller-Fischer et al. | |
| 2007/0035670 A1 | 2/2007 | Prior et al. | |
| 2007/0097327 A1 | 5/2007 | Yatsu et al. | |
| 2007/0165192 A1 | 7/2007 | Prior et al. | |
| 2007/0195277 A1 | 8/2007 | Fuse | |
| 2007/0195285 A1 | 8/2007 | Jaynes et al. | |
| 2007/0253028 A1 | 11/2007 | Widdowson | |
| 2007/0279600 A1 | 12/2007 | Belliveau et al. | |
| 2007/0291184 A1 | 12/2007 | Harville et al. | |
| 2007/0291185 A1 | 12/2007 | Gelb et al. | |
| 2007/0291189 A1 | 12/2007 | Harville | |
| 2007/0291233 A1* | 12/2007 | Culbertson et al. | 353/34 |
| 2008/0024490 A1 | 1/2008 | Loop et al. | |
| 2008/0123993 A1 | 5/2008 | Widdowson | |
| 2008/0221425 A1* | 9/2008 | Olson et al. | 600/407 |
| 2009/0195758 A1 | 8/2009 | Sobel et al. | |

FOREIGN PATENT DOCUMENTS

| | | |
|---|---|---|
| WO | 00/07376 | 2/2000 |

OTHER PUBLICATIONS

"Rough quadrilateralation from a triangular mesh via layer-based decomposition", IBM Technical Disclosure Bulletin, May 2000, UK, Issue 433, p. 907.*

M. Brown et al., "A Practical and Flexible Tiled Display System"; In Pactific Conf. on Comp. Graphics and Apps., 2002.

N. Chang, "Efficient Dense Correspondences Using Temporally-Encoded Light Patterns," IEEE Int'l Workshop on Projector-Camera Systems; Oct. 12, 2003. Nice, France.

A. Majumder et al., "Perceptual Photometric Seamlessness in Projection-Based Tiled Displays," In Acm Transactions on Graphics, vol. 24, No. 1, pp. 118-139; 2005.

A. Raij et al., "PixelFlex2: A Comprehensive, Automatic Casually-Aligned Multiprojector Display", IEEE Int'l Workshop on Projector-Camera Systems; Oct. 12, 2003. Nice, France.

R. Raskar et al., "Seamless Projection Overlaps Using Image Warping and Intensity Blending", 4th Int'l Conf. on Virtual Systems and Multimedia; Gifu, Japan, Nov. 1998.

R. Raskar et al., "Multiprojector Displays Using Camera-Based Registration", In IEEE Visualization; pp. 61-168; 1999.

R. Surati, "Scalable Self-Calibrating Display Technology for Seamless Large-Scale Displays", PhD thesis, Dept. of Computer Science, MIT, 1998.

R. Szeliski, "Video Mosaics for Virtual Environments", IEEE Computer Graphics and Applications, pp. 22-30, Mar. 1996.

D. Tanguay et al., "Nizza: A Framework for Developing Real-Time Streaming Multimedia Applications", HP Laboratories, HPL-2004-132, Aug. 2, 2004; 9 pgs.

R. Raskar et al., "iLamps: Geometrically Aware and Self-Configuring Projectors", in ACM Transactions on Graphics; vol. 22, No. 3, 2003; pp. 809-818.

C. Jaynes et al., "Super-Resolution Composition in Multi-Projector Displays", IEEE Int'l Workshop on Projector Camera Systems; Oct. 2003; 8 pgs.

L.M. Chen et al., "Visual Resolution Limits for Color Matrix Displays—One Panel Projectors", vol. 13, pp. 221-226; 1992.

A. Yasuda et al., "FLC Wobbling for High Resolution Projectors," Journal of teh SID; pp. 229-305, May 1997.

T. Tokita et al., "P-108: FLC Resolution-Enhancing Device for Projection Displays", pp. 638-641; SID 02 Digest 2002.

D.H. Kelley, "Motion and Vision—II. Stabilized Spatio-Temporal Threashold Surface"; Journal of the Optical Society of America, vol. 69, No. 10; Oct. 1979.

C.H. Brown Elliott et al., "Color Subpixel Rendering Projectors and Flat Panel Displays", SMPTE Advanced Motion Imaging Conference; pp. 1-4; Feb. 27-Mar. 1, 2003.

D.C. Chen, "Display Resolution Enhancement with Optical Scanners", Applied Optics, vol. 40, No. 5, pp. 636-643; Feb. 10, 2001.

Hewlett-Packard Development Company brochure entitled "The Use of Dual Graphics on the High-End HP xw9300 Workstation"; #5983-0684EN, 8 pgs.; Feb. 2005.

Silicon Optix webpage entitled "Geo-Overview"; 1 pg., Downloaded: Jan. 31, 2008.

Silicon Optix webpage entitled "Geo—Features"; 1 pg., Downloaded: Jan. 31, 2008.

Peterson, Samuel—"Computing Constrained Delaunay Triangulations" In The Plane, http://www.geom.uiuc.edu/%7Esamuelp/del_project.html: Jun. 16, 2003.

Stone, Maureen C.—"Color and Brightness Appearance Issues for Tiled Displays"—Mar. 2001—Computer Graphics and Applications.

M. Ashdown et al.—"A Flexible Projector-Camera System for Multi-Planar Displays"—Proceedings of IEEE Conference on Computer Vision and Pattern Recognition—Jun. 27, 2004—vol. 2—pp. 165-172.

M. Brown et al.—"Camera-Base Calibration Techniques for Seamless Multi-projector Displays"—IEEE Transactions on Visualization and Computer Graphics—vol. 11 No. 2—Mar. 2005.

M. Harville et al.—"Practical Methods for Geometric and Photometric Correction of Tiled Projector Displays on Curved Surfaces"—Conference on Computer Vision and Pattern Recognition, Jun. 17, 2006.

* cited by examiner

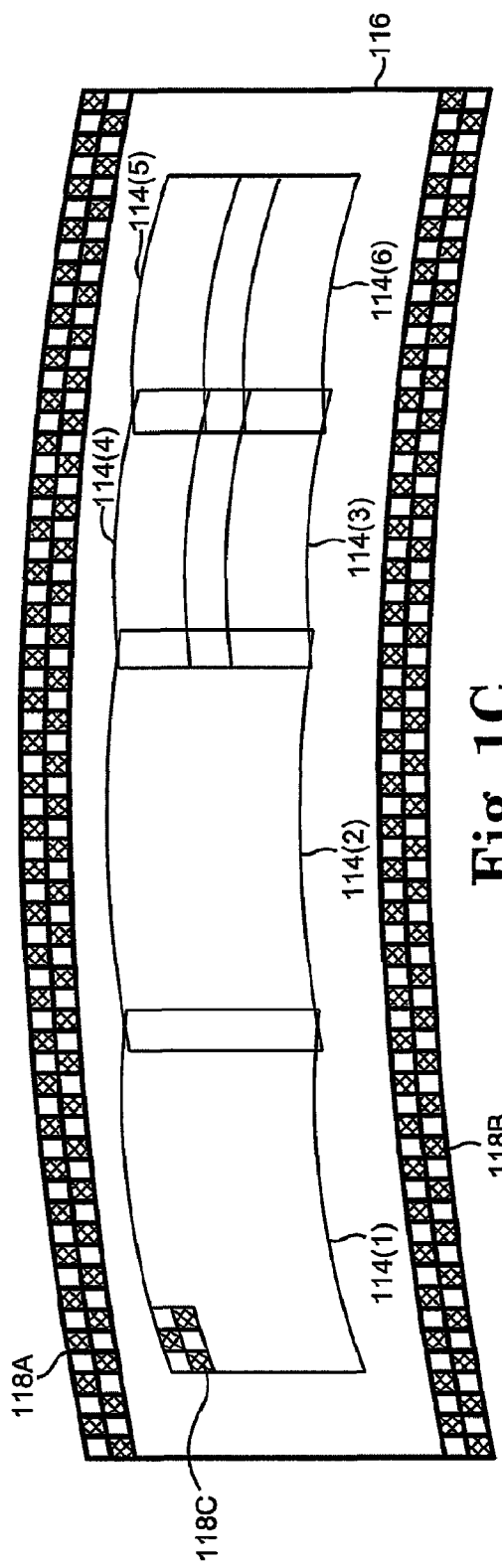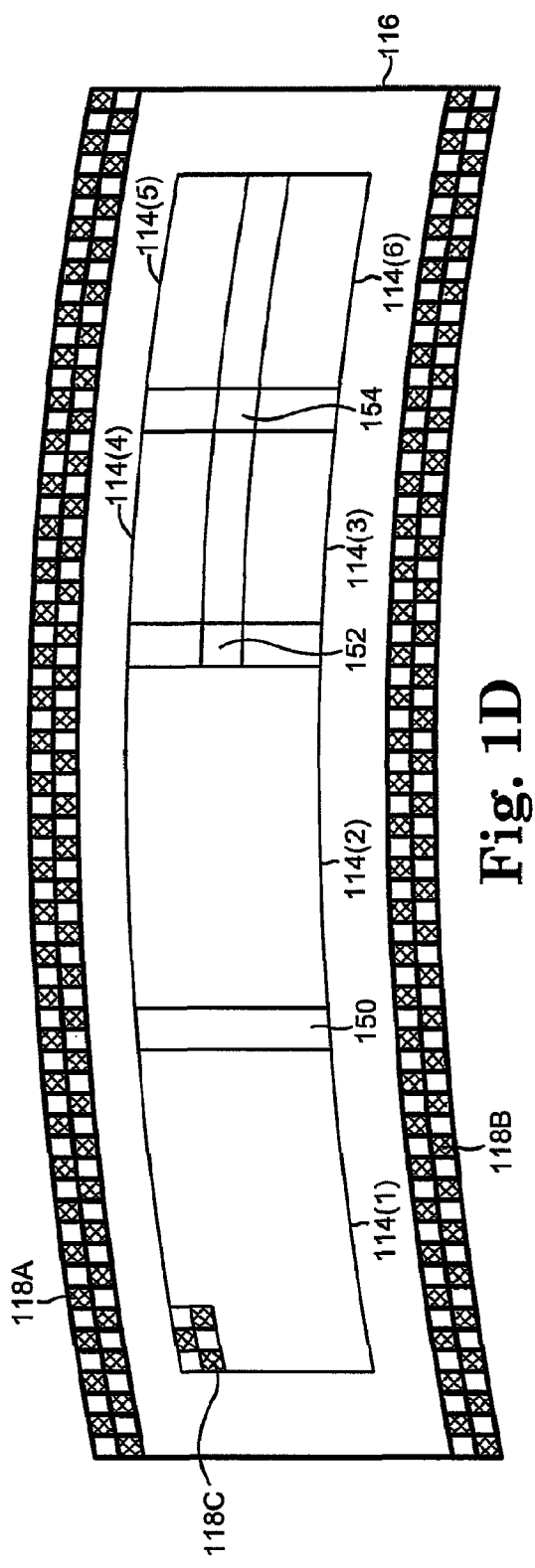

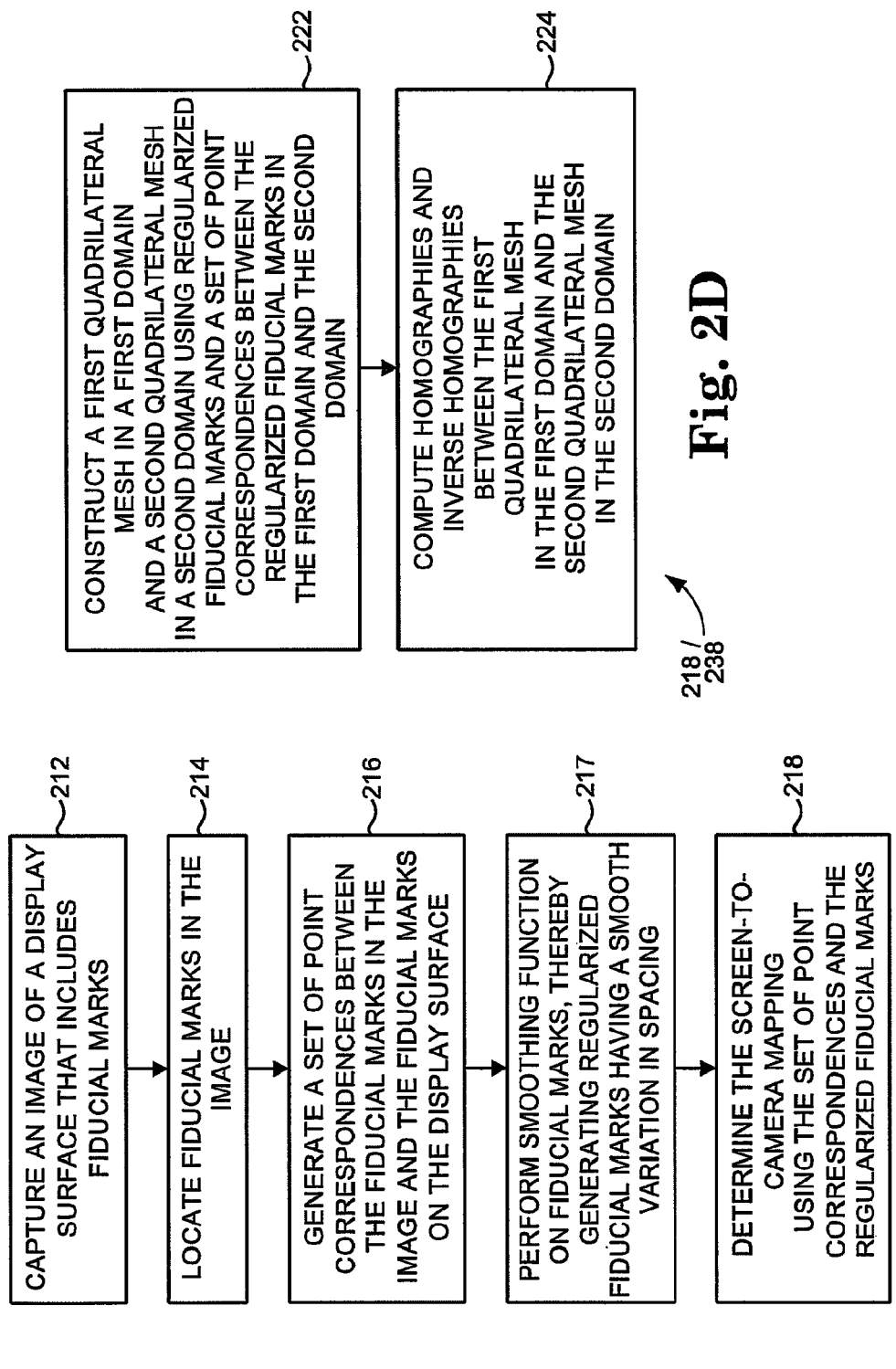

MESH FOR MAPPING DOMAINS BASED ON REGULARIZED FIDUCIAL MARKS

CROSS-REFERENCE TO RELATED APPLICATIONS

This application is related to U.S. patent application Ser. No. 11/455,306, filed Jun. 16, 2006, and entitled "Mesh for Rendering an Image Frame"; and U.S. patent application Ser. No. 12/023,938, filed Jan. 31, 2008, and entitled "Meshes for Separately Mapping Color Bands"; the entirety of both of which are incorporated herein by reference.

BACKGROUND

Many cameras that capture images have planar image planes to produce planar images. Planar images captured by such cameras may be reproduced onto planar surfaces. When a viewer views a planar image that has been reproduced onto a planar surface, the viewer generally perceives the image as being undistorted, assuming no keystone distortion, even when the viewer views the image at oblique angles to the planar surface of the image. If a planar image is reproduced onto a non-planar surface (e.g., a curved surface) without any image correction, the viewer generally perceives the image as being distorted.

Display systems that reproduce images in tiled positions may provide immersive visual experiences for viewers. While tiled displays may be constructed from multiple, abutting display devices, these tiled displays generally produce undesirable seams between the display devices that may detract from the experience. In addition, because these display systems generally display planar images, the tiled images may appear distorted and unaligned if displayed on a non-planar surface without correction. In addition, the display of the images with multiple display devices may be inconsistent because of the display differences between the devices.

SUMMARY

One embodiment provides a method that includes capturing a first image of a display surface with an image capture device, the display surface having a first plurality of fiducial marks. A first smoothing function is performed on fiducial marks appearing in the first image, thereby generating a first regularized set of fiducial marks having a smooth variation in spacing between adjacent fiducial marks. A first plurality of meshes is generated based on the first regularized set of fiducial marks. The first plurality of meshes is configured to map a first domain associated with the display surface to a second domain associated with the image capture device.

BRIEF DESCRIPTION OF THE DRAWINGS

FIG. 1C is a schematic diagram illustrating the projection of partially overlapping images onto a developable surface without correction according to one embodiment.

FIG. 1D is a schematic diagram illustrating the projection of partially overlapping images onto a developable surface with correction according to one embodiment.

FIGS. 2A-2F are flow charts illustrating methods for geometric correction according to one embodiment.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., may be used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

I. Generation and Display of Partially Overlapping Frames Onto a Surface

Figure 1A:
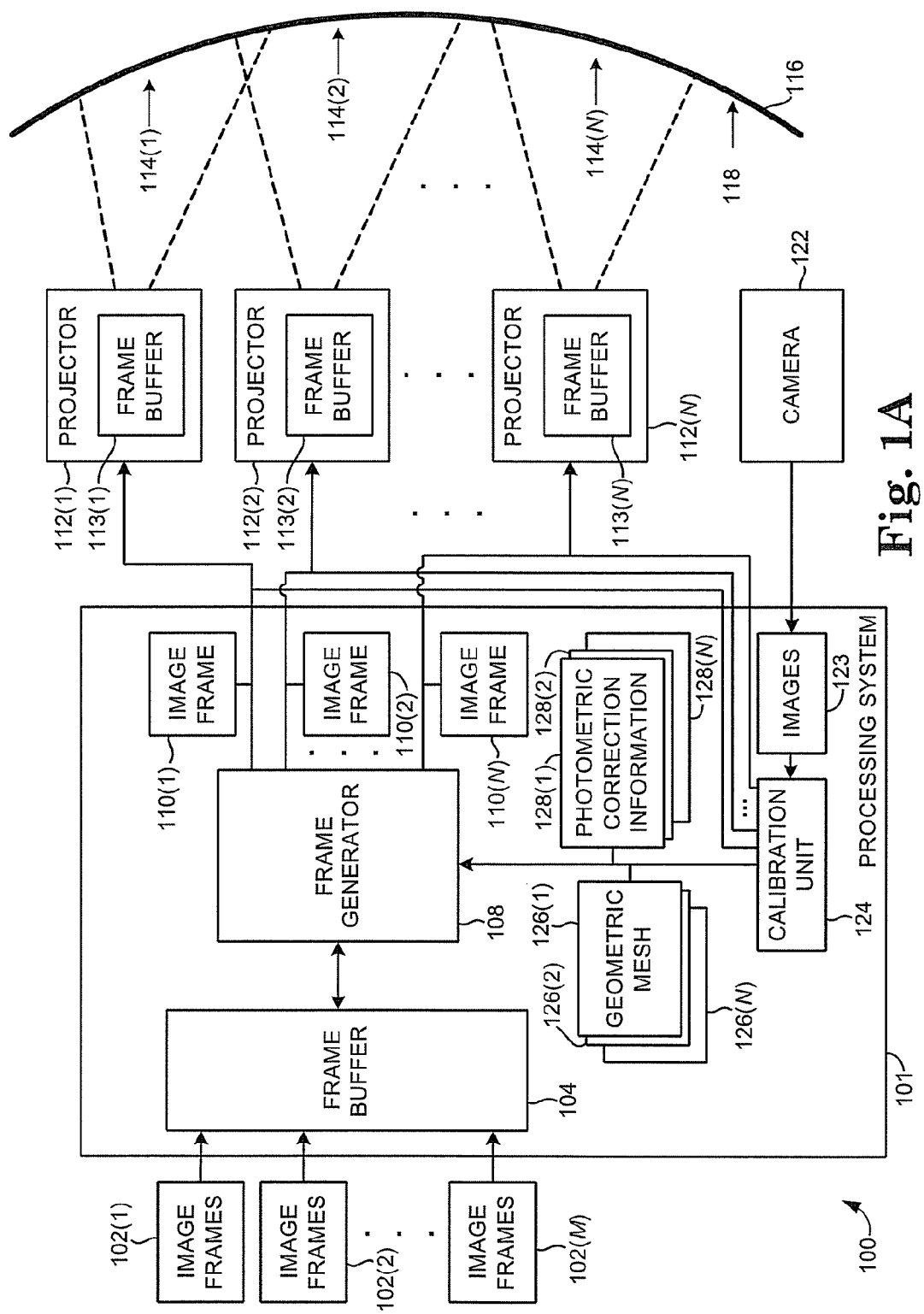
FIG. 1A is a block diagram illustrating an image display system according to one embodiment.

FIG. 1A is a block diagram illustrating an image display system 100 according to one embodiment. Image display system 100 includes a processing system 101, projectors 112(1) through 112(N) where N is greater than or equal to one (collectively referred to as projectors 112), and at least one camera 122. Processing system 101 includes image frame buffer 104, frame generator 108, and calibration unit 124.

Processing system 101 receives streams of image frames 102(1) through 102(M) where M is greater than or equal to one (referred to collectively as image frames 102) using any suitable wired or wireless connections including any suitable network connection or connections. The streams of image frames 102(1) through 102(M) may be captured and transmitted by attached or remote image capture devices (not shown) such as cameras, provided by an attached or remote storage medium such as a hard-drive, a DVD or a CD-ROM, or otherwise accessed from one or more storage devices by processing system 101.

In one embodiment, a first image capture device captures and transmits image frames 102(1), a second image capture device captures and transmits image frames 102(2), and an Mth image capture device captures and transmits image frames 102(M), etc. The image capture devices may be arranged in one or more remote locations and may transmit the streams of image frames 102(1) through 102(M) across one or more networks (not shown) using one or more network connections.

In one embodiment, the number M of streams of image frames 102 is equal to the number N of projectors 112. In other embodiments, the number M of streams of image frames 102 is greater than or less than the number N of projectors 112. The numbers M and N are not necessarily related. Image frames 110 can be composed from image frames 102 in any manner. For example, an image frame 110 can be formed by compositing part of a first image frame 102 and part of a second image frame 102.

Image frames 102 may be in any suitable video or still image format such as MPEG-2 (Moving Picture Experts Group), MPEG-4, JPEG (Joint Photographic Experts Group), JPEG 2000, TIFF (Tagged Image File Format), BMP (bit mapped format), RAW, PNG (Portable Network Graphics), GIF (Graphic Interchange Format), XPM (X Window System), SVG (Scalable Vector Graphics), and PPM (Portable Pixel Map).

Image frame buffer 104 receives and buffers image frames 102. Frame generator 108 processes buffered image frames 102 to form image frames 110(1) through 110(N) (collectively referred to as image frames 110). In one embodiment, frame generator 108 processes a single stream of image frames 102 to form one or more image frames 110. In other embodiments, frame generator 108 processes multiple streams of image frames 102 to form one or more image frames 110.

In one embodiment, frame generator 108 processes image frames 102 to define image frames 110(1) through 110(N) using respective geometric meshes 126(1) through 126(N) (collectively referred to as geometric meshes 126) and respective photometric correction information 128(1) through 128(N) (collectively referred to as photometric correction information 128). Frame generator 108 provides frames 110(1) through 110(N) to projectors 112(1) through 112(N), respectively.

Projectors 112(1) through 112(N) store frames 110(1) through 110(N) in image frame buffers 113(1) through 113(N) (collectively referred to as image frame buffers 113), respectively. Projectors 112(1) through 112(N) project frames 110(1) through 110(N), respectively, onto display surface 116 to produce projected images 114(1) through 114(N) for viewing by one or more users. In one embodiment, projectors 112 project frames 110 such that each displayed image 114 at least partially overlaps with another displayed image 114. Thus, image display system 100 according to one embodiment displays images 114 in at least partially overlapping positions (e.g., in a tiled format) on display surface 116.

Projected images 114 are defined to include any combination of pictorial, graphical, or textural characters, symbols, illustrations, or other representations of information. Projected images 114 may be still images, video images, or any combination of still and video images.

Display surface 116 includes any suitable surface configured to display images 114. In one or more embodiments described herein, display surface 116 forms a developable surface. As used herein, the term developable surface is defined as a surface that is formed by folding, bending, cutting, and otherwise manipulating a planar sheet of material without stretching the sheet. A developable surface may be planar, piecewise planar, or non-planar. A developable surface may form a shape such as a cylindrical section or a parabolic section. Non-planar developable display surfaces may allow a viewer to feel immersed in the projected scene. In addition, such surfaces may fill most or all of a viewer's field of view which allows scenes to be viewed as if they are at the same scale as they would be seen in the real world. As described in additional detail below, image display system 100 according to one embodiment is configured to display projected images 114 onto a developable surface without geometric distortion.

By displaying images 114 onto a developable surface, images 114 are projected to appear as if they have been "wallpapered" to the developable surface where no pixels of images 114 are stretched. The wallpaper-like appearance of images 114 on a developable surface appears to a viewer to be undistorted.

Figure 1B:
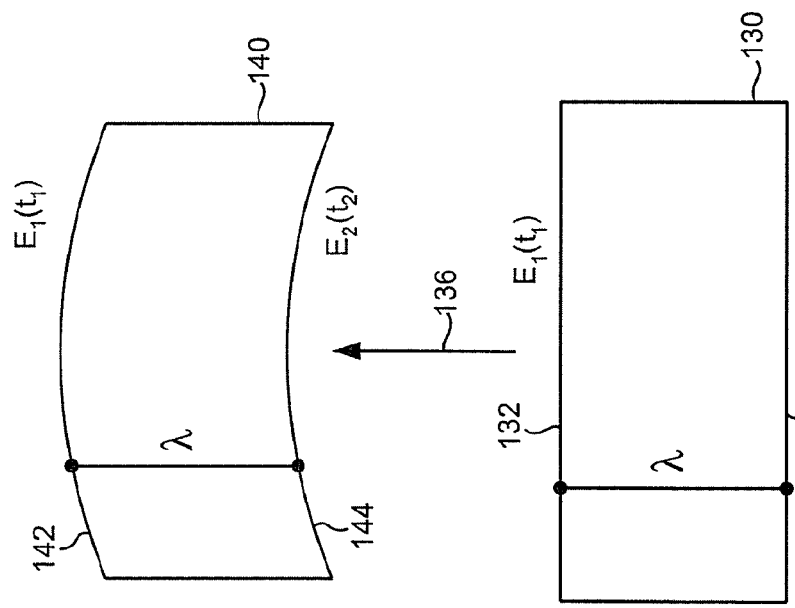
FIG. 1B is a schematic diagram illustrating a developable surface according to one embodiment.

A developable surface can be described by the motion of a straight line segment through three-dimensional (3D) space. FIG. 1B is a schematic diagram illustrating a planar surface 130. As shown in FIG. 1B, planar surface 130 is a shape that can be created by moving a straight line segment λ through 3D space. $E_1(t_1)$ and $E_2(t_2)$ represent endpoint curves 132 and 134 traced by the movement of the endpoints of the line segment λ. Endpoint curves 132 and 134 swept out in 3D space by the endpoints of the line segment λ are sufficient to define the entire surface 130. With planar developable surface 130, endpoint curves 132 and 134 are straight, parallel lines.

When planar surface 130 is curved into a non-planar developable surface 140 without stretching as indicated by an arrow 136, the straight endpoint curves 132 and 134 become curved endpoint curves 142 and 144 in the example of FIG. 1B. Curving planar surface 130 into non-planar surface 140 may be thought of as analogous to bending, folding, or wallpapering planar surface 130 onto a curved surface without stretching. Endpoint curves 142 and 144 swept out in 3D space by the endpoints of the line segment λ are sufficient to define the entire surface 140.

Image display system 100 may be configured to construct a two-dimensional (2D) coordinate system corresponding to planar surface 130 from which non-planar surface 140 was created using a predetermined arrangement of identifiable points in fiducial marks on display surface 116. The geometry of the predetermined arrangement of identifiable points may be described according to distance measurements between the identifiable points. The distances between a predetermined arrangement of points may all be scaled by a single scale factor without affecting the relative geometry of the points, and hence the scale of the distances between the points on display surface 116 does not need to be measured. In the embodiment shown in FIG. 1B, the predetermined arrangement of points lie in fiducial marks along the curved endpoint curves $E_1(t_1)$ and $E_2(t_2)$ in display surface 116. These endpoint curves define a 2D coordinate system in the planar surface 130 created by flattening curved display surface 140. Specifically, $E_1(t_1)$ and $E_2(t_2)$ are parallel in surface 130, with the connecting line segment λ lying in the orthogonal direction at each t.

In one embodiment, image display system 100 displays images 114 on display surface 116 with a minimum amount of distortion, smooth brightness levels, and a smooth color gamut. To do so, frame generator 108 applies geometric and photometric correction to image frames 102 using geometric meshes 126 and photometric correction information 128, respectively, in the process of rendering frames 110. Geometric correction is described in additional detail in Section II below, and photometric correction is described in additional detail in U.S. patent application Ser. No. 11/455,306, filed on Jun. 16, 2006, and entitled MESH FOR RENDERING AN IMAGE FRAME, which is incorporated by reference Frame generator 108 may perform any suitable image decompression, color processing, and conversion on image frames 102. For example, frame generator 108 may convert image frames 102 from the YUV-4:2:0 format of an MPEG2 video stream to an RGB format. In addition, frame generator 108 may transform image frames 102 using a matrix multiply to translate, rotate, or scale image frames 102 prior to rendering. Frame generator 108 may perform any image decompression, color processing, color conversion, or image transforms prior to rendering image frames 102 with geometric meshes 126 and photometric correction information 128.

Calibration unit 124 generates geometric meshes 126 and photometric correction information 128 using images 123 captured by at least one camera 122 during a calibration process. Camera 122 may be any suitable image capture device configured to capture images 123 of display surface 116. Camera 122 captures images 123 such that the images include screen fiducial marks 118A and 118B (shown as fiducial marker strips 118A and 118B in FIGS. 1C and 1D) and projector fiducial marks 118C on display surface 116. Fiducial marks 118A, 118B, and 118C are collectively referred to as fiducial marks 118. Fiducial marks 118 may be any suitable pattern or set of patterns that include a set of points with predetermined arrangement of the points where the patterns are recognizable by a pattern recognition algorithm. Screen fiducial marks 118A and 118B may be permanently attached to display surface 116 or may be applied to display surface 116 only during the calibration process. Projector fiducial marks 118C are projected onto display surface 116 by projectors 112. In one embodiment, projector fiducial marks 118C cover the entire display area of display surface 116, but only a subset of these fiducial marks 118C are shown in FIGS. 1C and 1D to simplify the illustration.

Calibration unit 124 uses the predetermined arrangement of points to create a mapping of display surface 116. The predetermined arrangement of identifiable points may be described by distance measurements between the identifiable points in the 2D space of flattened display surface 116, where the scale of the distance measurements is not necessarily known. Fiducial marks 118A and 118B may be located outside of the display area on display surface 116 where images 114 will appear when displayed by projectors 112. In the embodiment shown in FIGS. 1C and 1D, fiducial marker strips 118A and 118B form black and white checkerboard patterns at the top and bottom of display surface 116 where the distance between the corners of the checkerboard patterns in the horizontal direction is known by image display system 100. In other embodiments, fiducial marks 118A and 118B may form any other suitable pattern. In further embodiments, fiducial marks 118A and 118B may also consist of active light emitters, such as LEDs, lasers, or infrared light sources. These light sources may optionally be deactivated during display of images 114 on display surface 116.

In one embodiment, camera 122 includes a single camera configured to capture images 123 that each includes the entirety of display surface 116. In other embodiments, camera 122 includes multiple cameras each configured to capture images 123 that include a portion of display surface 116 where the combined images 123 of the multiple cameras include the entirety of display surface 116.

FIG. 1C is a schematic diagram illustrating the projection of partially overlapping images 114(1) through 114(6) onto a non-planar developable display surface 116 without correction. In FIG. 1C, images 114(1) through 114(6) appear as a set of distorted (i.e., warped) and disjointed (i.e., unaligned) images. Each image 114(1) through 114(6) appears distorted because of the display of a planar image onto a non-planar surface, and the set of images 114(1) through 114(6) appears disjointed because images 114 are not spatially aligned or otherwise displayed in a uniform way on display surface 116.

Without photometric correction, regions of overlap between images 114 may appear brighter than non-overlapping regions. In addition, variations between projectors 112 may result in variations in brightness and color gamut between projected images 114(1) through 114(6).

FIG. 1D is a schematic diagram illustrating the projection of images 114(1) through 114(6) onto non-planar developable display surface 116 with geometric and photometric correction. By applying geometric correction as described in Section II below, frame generator 108 unwarps, spatially aligns, and crops images 114(1) through 114(6) to minimize distortion in the display of images 114(1) through 114(6) on display surface 116. Frame generator 108 spatially aligns images 114(1) through 114(6) as shown in FIG. 1D.

In addition, frame generator 108 may smooth any variations in brightness and color gamut between projected images 114(1) through 114(6) by applying photometric correction. For example, frame generator 108 may smooth variations in brightness in overlapping regions such as an overlapping region 150 between images 114(1) and 114(2), an overlapping region 152 between images 114(2), 114(3), and 114(4), and an overlapping region 154 between images 114(3), 114(4), 114(5), and 114(6). Frame generator 108 may smooth variations in brightness between images 114 displayed with different projectors 112.

Processing system 101 includes hardware, software, firmware, or a combination of these. In one embodiment, one or more components of processing system 101 are included in a computer, computer server, or other microprocessor-based system capable of performing a sequence of logic operations. In addition, processing can be distributed throughout the system with individual portions being implemented in separate system components, such as in a networked or multiple computing unit environment.

Image frame buffer 104 includes memory for storing one or more image frames of the streams of image frames 102. Thus, image frame buffer 104 constitutes a database of one or more image frames 102. Image frame buffers 113 also include memory for storing image frames 110. Although shown as separate frame buffers 113 in projectors 112 in the embodiment of FIG. 1, frame buffers 113 may be combined (e.g., into a single frame buffer) and may be external to projectors 112 (e.g., in processing system 101 or between processing system 101 and projectors 112) in other embodiments. Examples of image frame buffers 104 and 113 include non-volatile memory (e.g., a hard disk drive or other persistent storage device) and volatile memory (e.g., random access memory (RAM)).

It will be understood by a person of ordinary skill in the art that functions performed by processing system 101, including frame generator 108 and calibration unit 124, may be implemented in hardware, software, firmware, or any combination thereof. The implementation may be via one or more microprocessors, graphics processing units (GPUs), programmable logic devices, or state machines. In addition, functions of frame generator 108 and calibration unit 124 may be performed by separate processing systems in other embodiments. In such embodiments, geometric meshes 126 and photometric correction information 128 may be provided from calibration unit 124 to frame generator 108 using any suitable wired or wireless connection or any suitable intermediate storage device. Components of the present invention may include computer-implemented methods and may reside in software on one or more computer-readable mediums. The term computer-readable medium as used herein is defined to include any kind of memory, volatile or non-volatile, such as floppy disks, hard disks, CD-ROMs, flash memory, read-only memory, and random access memory.

II. Geometric Calibration and Correction of Displayed Images

In one embodiment, image display system 100 applies geometric correction to image frames 102 as part of the process of rendering image frames 110. The geometric correction according to one embodiment corrects geometric distortions caused by projection onto a non-planar surface 116, and by noise introduced in finding fiducial points. As a result of the geometric correction, image display system 100 displays images 114 on display surface 116 using image frames 110 such that viewers may view images as being undistorted for all viewpoints of display surface 116.

Image display system 100 generates geometric meshes 126 as part of a geometric calibration process. Image display system 100 determines geometric meshes 126 using predetermined arrangements of fiducial marks 118. In one embodiment, image display system 100 determines geometric meshes 126 without knowing the shape or any dimensions of display surface 116 other than the predetermined arrangement of fiducial marks 118.

Frame generator 108 renders image frames 110 using respective geometric meshes 126 to unwarp, spatially align, and crop frames 102 into shapes that are suitable for display on display surface 116. Frame generator 108 renders image frames 110 to create precise pixel alignment between overlapping images 114 in the overlap regions (e.g., regions 150, 152, and 154 in FIG. 1D).

The geometric calibration process according to one embodiment uses fiducial points (e.g., fiducial marks 118), some of which are printed or physically placed, and some of which are projected, on the display surface 116. In one embodiment, calibration unit 124 generates calibration data for removing distortion that would otherwise be caused by noise that occurs when the fiducial points are located in the camera images 123 and projector frame buffers 113 or printed. In one embodiment, homographic interpolation is used as part of the geometric calibration. Homographic interpolation can correctly model camera perspective projection geometry by eliminating the effect of camera position and viewing angle, and is suitable for wallpaper projection. The noise introduced in finding fiducial points can cause high frequency oscillations and interpolation ambiguity when using homographic interpolation. One embodiment uses a globally smooth function (e.g., parametric curve or surface) to regularize fiducial points, eliminate detection and measurement noise, and provide accurate homographic interpolation. A goal of the smoothing according to one embodiment is to regularize fiducial points so that the distances between points vary smoothly according to the correct geometry.

Computing a geometric mapping between two coordinate spaces involves two corresponding sets of fiducial points in the two spaces, and any other corresponding points in the two spaces can then be mapped from each other by interpolation from the fiducial points. A homography is a plane-to-plane transformation that can be uniquely determined by four pairs of corresponding fiducial points between two planes. Any points on the planes of the fiducials can be mapped from each other using the resulting homography or its inverse homography (i.e., homographic interpolation). As it correctly models the camera perspective projection geometry, homographic interpolation is suitable for computing the geometric mappings to achieve wallpaper projection. The following Equation I shows a homographic interpolation using a homographic transformation matrix, H, to map a point (x, y) in a first plane to a corresponding point (x', y') in a second plane:

$$\mu[x'y'1]^T = H[xy1]^T \qquad \text{Equation I}$$

Where:
  $\mu$=scale factor;
  x, y=coordinates of a point in a first plane;
  x', y'=coordinates of a point in a second plane;
  H=homographic transformation matrix; and
  T=transpose.

The following Equation II shows a homographic interpolation using an inverse homographic transformation matrix, $H^{-1}$, to map a point (x', y') in a second plane to a corresponding point (x, y) in a first plane:

$$v[xy1]^T = H^{-1}[x'y'1]^T \qquad \text{Equation II}$$

Where:
  v=scale factor;
  x, y=coordinates of a point in a first plane;
  x', y'=coordinates of a point in a second plane;
  $H^{-1}$=inverse homographic transform matrix; and
  T=transpose.

In one embodiment, the display surface 116 is modeled as piecewise planar and can be approximated by a quadrilateral mesh, formed by connecting all adjacent fiducials 118A and 118B at the top and bottom of the surface 116, and from every top ith fiducial to the corresponding bottom ith fiducial. Each such quadrilateral on the display surface 116 and its corresponding quadrilateral in a camera image 123 can determine a unique homography, and any internal point within a quadrilateral can be computed by homographic interpolation. In one embodiment, before computing homographies, fiducial noise is removed, as described in further detail below.

In the following description of generating and using geometric meshes 126, four types of 2D coordinate systems will be discussed. First, a projector domain coordinate system, $P_i$, represents coordinates in frame buffer 113 of the ith projector 112. Second, a camera domain coordinate system, $C_j$, represents coordinates in images 123 captured by the jth camera 122. Third, a screen domain coordinate system, S, represents coordinates in the plane formed by flattening display surface 116. Fourth, an image frame domain coordinate system, I, represent coordinates within image frames 102 to be rendered by frame generator 108.

Image display system 100 performs geometric correction on image frames 102 to conform images 114 to display surface 116 without distortion. Accordingly, in the case of a single input image stream, the image frame domain coordinate system, I, of image frames 102 may be considered equivalent to the screen domain coordinate system, S, up to a scale in each of the two dimensions. By normalizing both coordinate systems to the range [0, 1], the image frame domain coordinate system, I, becomes identical to the screen domain coordinate system, S. Therefore, if mappings between the screen domain coordinate system, S, and each projector domain coordinate system, $P_i$, are determined, then the mappings between each projector domain coordinate system, $P_i$, and the image frame domain coordinate system, I, may be determined.

Figure 2A:
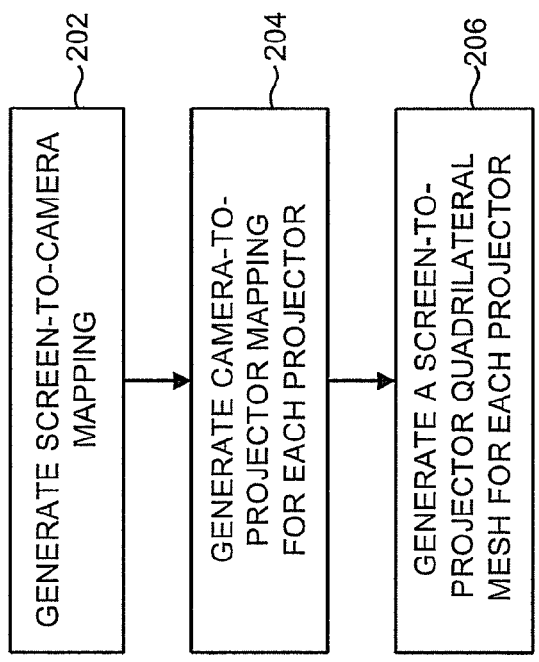
Figure 2B:
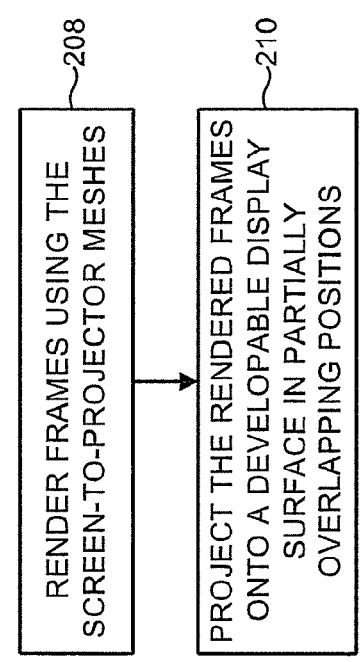
Figure 2E:
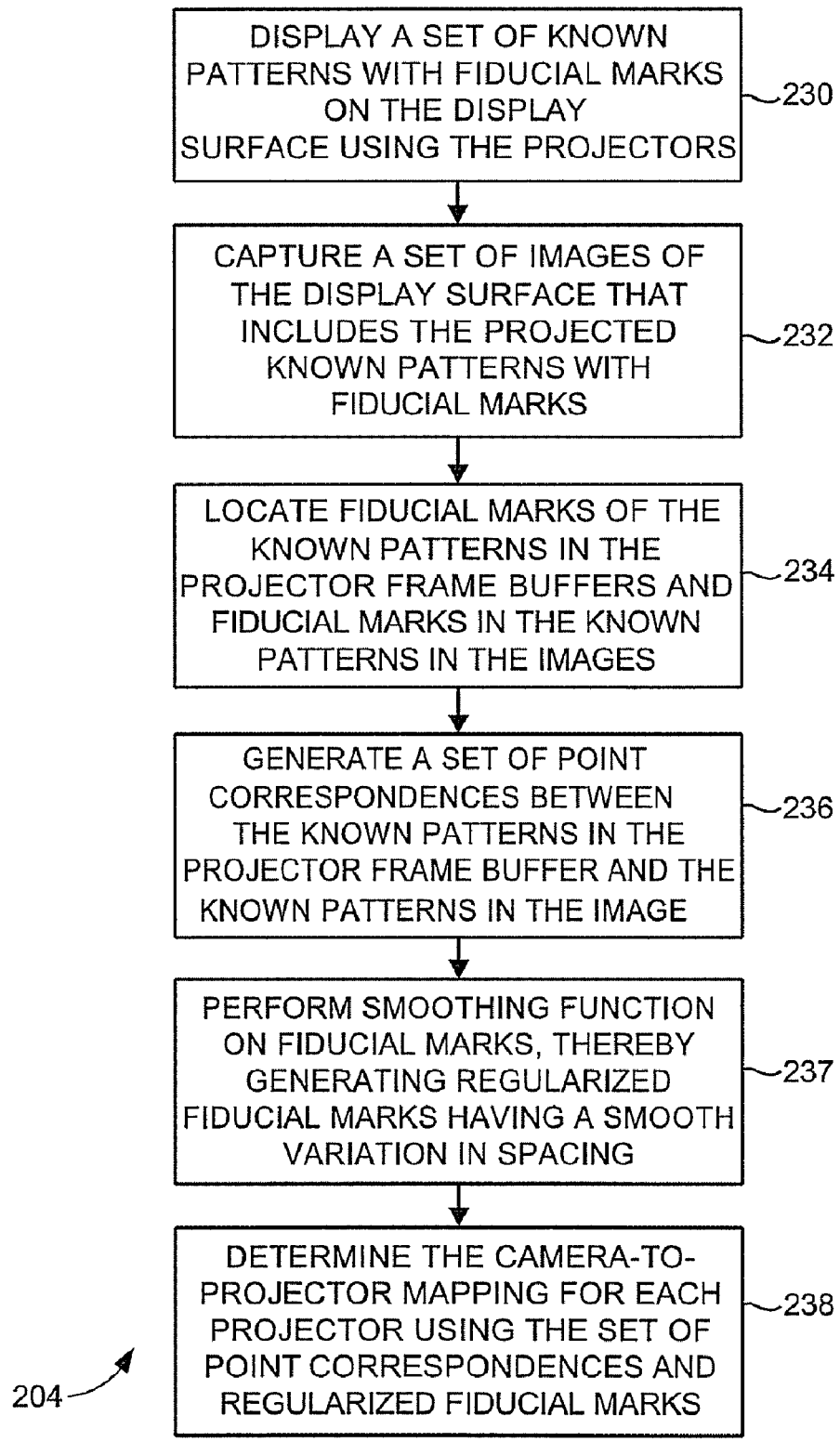

Methods of performing geometric correction will now be described in additional detail with reference to the embodiments of FIGS. 2A-2E. FIGS. 2A-2E are flow charts illustrating methods for geometric correction. FIG. 2A illustrates the overall calibration process to generate geometric meshes 126 according to one embodiment, and FIG. 2B illustrates the rendering process using geometric meshes 126 to perform geometric correction on image frames 102 according to one embodiment. FIGS. 2C through 2E illustrate additional details of the functions of the blocks shown in FIG. 2A. The embodiments of FIGS. 2A-2E will be described with reference to image display system 100 as illustrated in FIG. 1. The methods of FIGS. 2A-2E will be described for an embodiment of image display system 100 that includes a single camera 122.

In the embodiments described below, a quadrilateral mesh is formed by a set of quadrilaterals, where each quadrilateral is described with a set of four coordinate locations (e.g., corners of the quadrilateral). Each quadrilateral in a quadrilateral mesh corresponds to another quadrilateral (i.e., a set of four coordinate locations or corners) in another quadrilateral mesh from another domain. Accordingly, corresponding quadrilaterals in two domains may be represented by eight coordinate locations—four coordinate locations in the first domain and four coordinate locations in the second domain.

In FIG. 2A, calibration unit 124 generates a screen-to-camera mapping as indicated in a block 202. In particular, calibration unit 124 computes homographies or inverse homographies that map between a quadrilateral mesh in the screen domain and a corresponding quadrilateral mesh in the camera domain. Calibration unit 124 generates this mapping using knowledge of a predetermined arrangement of fiducial marks 118A and 118B, and an image 123 captured by camera 122 that includes these fiducial marks 118A and 118B on display surface 116.

Calibration unit 124 also generates a camera-to-projector mapping for each projector 112 as indicated in a block 204. In particular, calibration unit 124 computes homographies or inverse homographies that map between a second quadrilateral mesh in the camera domain and a corresponding quadrilateral mesh in the projector domain for each projector 112. Calibration unit 124 generates these mappings from known pattern sequences, which contain projector fiducial marks 118C, displayed by projectors 112 and a set of images 123 captured by camera 122 viewing display surface 116 while these known pattern sequences are projected by projectors 112.

Calibration unit 124 generates a screen-to-projector quadrilateral mesh, also referred to as geometric mesh 126, for each projector 112 as indicated in a block 206, using the screen-to-camera mapping generated at 202 and the camera-to-projector mappings generated at 204.

In the embodiments described below, geometric meshes 126 will be described as quadrilateral meshes. In other embodiments, geometric meshes 126 may be polygonal meshes formed by polygons with z sides, where z is greater than or equal to three. In these embodiments, corresponding polygons in two domains may be represented by 2z ordered coordinate locations—z ordered coordinate locations in the first domain and z ordered coordinate locations in the second domain.

Referring to FIG. 2B, frame generator 108 renders frames 110 for each projector 112 using the respective geometric mesh 126 as indicated in a block 208. Frame generator 108 provides respective frames 110 to respective frame buffers 113 in respective projectors 112. Projectors 112 project respective frames 110 onto display surface 116 in partially overlapping positions as indicated in a block 210. Because each geometric mesh 126 defines a mapping between display surface 116 and a frame buffer 113 of a respective projector 112, frame generator 108 uses geometric meshes 126 to warp frames 102 into frames 110 such that frames 110 appear spatially aligned and without distortion when projected by projectors 112 as images 114 in partially overlapping positions on display surface 116. Frame generator 108 interpolates the pixel values for frames 110 from frames 102 using the geometric meshes 126.

FIG. 2C illustrates a method for performing the function of block 202 of FIG. 2A. Namely, the method of FIG. 2C illustrates one embodiment of generating a screen-to-camera mapping. The method of FIG. 2C will be described with reference to FIGS. 3A-3B.

In FIG. 2C, camera 122 captures an image 123A (shown in FIG. 3A) of display surface 116 that includes fiducial marks 118A and 118B as indicated in a block 212. Fiducial marks 118A and 118B include points identifiable in image 123A by calibration unit 124 where the arrangement of the points is predetermined. For example, fiducial marks 118A and 118B may form a black and white checkerboard pattern where the distances between all adjacent corners are the same linear distance.

Figure 3A:
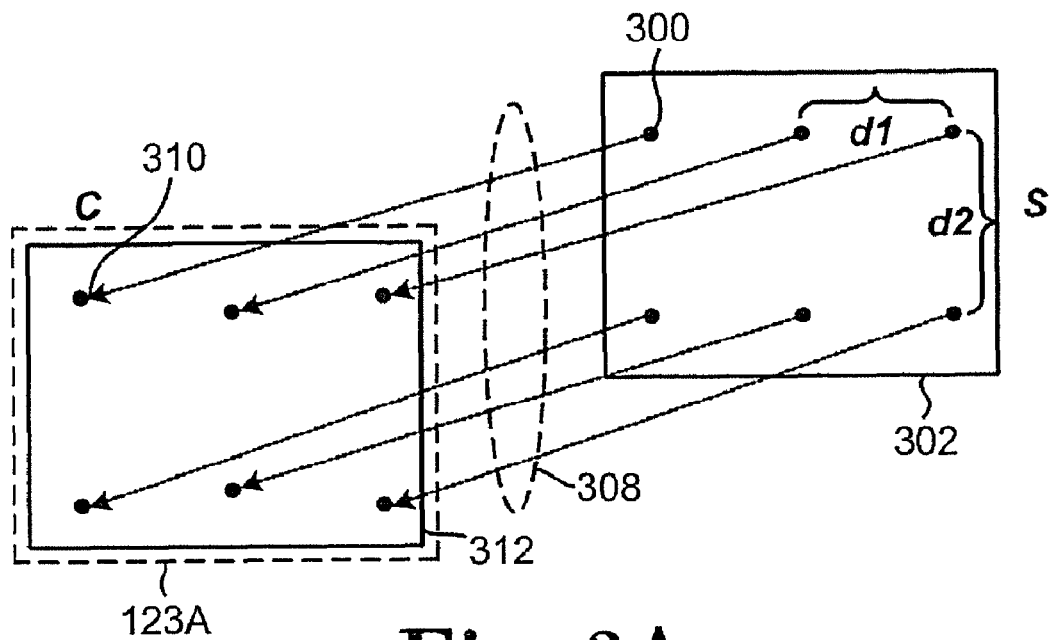
FIGS. 3A-3B are schematic diagrams illustrating the generation of screen-to-camera mappings according to one embodiment.

Calibration unit 124 locates fiducial marks 118A and 118B in image 123A as indicated in a block 214. Calibration unit 124 locates fiducial marks 118A and 118B to identify where points are located according to a predetermined arrangement on display screen 116. In FIG. 3A, points 300 represent the fiducial marks 118A and 118B in a screen domain (S) 302 corresponding to display screen 116. The fiducial marks 300 are separated by an example predetermined arrangement—with a predetermined separation distance (d1) in the horizontal direction and a predetermined separation distance (d2) in the vertical direction on display screen 116. Points 310 represent the fiducial marks 118A and 118B in a camera domain (C) 312 that are identified in image 123A by calibration unit 124. In other embodiments, fiducial marks 118A and 118B and correspondingly points 300 may be arranged with other known geometry, distances, and/or other scaling information between points.

Referring to FIGS. 2C and 3A, calibration unit 124 generates a set of point correspondences 308 between fiducial marks 118A and 118B detected in image 123A (i.e., points 310 in camera domain 312) and fiducial marks 118A and 118B on display surface 116 (i.e., points 300 in screen domain 302) as indicated in a block 216. The set of point correspondences 308 are represented by arrows that identify corresponding points in screen domain 302 and camera domain 312. These correspondences are generated by matching detected fiducial marks in camera image 123A (i.e., points 310) with the predetermined arrangement of fiducial marks 118A and 118B on display surface 116.

Calibration unit 124 performs a smoothing function on fiducial marks 118A and 118B detected in image 123A (i.e., points 310 in camera domain 312) and fiducial marks 118A and 118B on display surface 116 (i.e., points 300 in screen domain 302), thereby generating a set of regularized fiducial marks having a smooth variation in spacing between adjacent fiducial marks, as indicated in a block 217. Noise introduced in both measuring geometric coordinates of the fiducial marks 118A and 118B on display surface 116 and in detecting the fiducial marks 118A and 118B in image 123A causes the geometric coordinates of fiducial marks to deviate from correct locations in both normal and tangential directions, which can result in homographic interpolation errors. In one embodiment, such noise is removed at 217 by making use of the fact that the horizontal and vertical spacings between adjacent fiducial marks should vary smoothly both on the screen and in the camera image (constant interval is merely a special case of smooth varying), and a globally smooth function, such as a polynomial curve, parameterized by the sequential index of fiducials, is fitted to each of the top and bottom rows of both physical screen fiducials 118A and 118B (i.e., points 300 in screen domain 302) and detected camera image fiducials (i.e., points 310 in camera domain 312). The geometric coordinates of these fiducials are then adjusted according to the resulting smooth functions to ensure the smooth varying of the horizontal and vertical spacings.

Consider only the top row of the screen fiducial marks 118A, as the same applies to the bottom row of fiducial marks 118B. Let the leftmost fiducial mark 118A on the display surface 116 be the starting point, $s_0$, with $s'_0$ being its corresponding camera image point. Let s be the arc length from any fiducial mark to $s_0$. After perspective projection, the arc length, s', from any camera image fiducial to $s'_0$, can be expressed as a function of s as shown in the following Equation III:

$$s'=h(s)\qquad\text{Equation III}$$

A curve that fits the camera image fiducials, (x, y), can be parameterized by s', which in turn can be parameterized by s, as shown in the following Equations IV and V:

$$x=f_x(s')=f_x(h(s))\qquad\text{Equation IV}$$

$$y=f_y(s')=f_y(h(s))\qquad\text{Equation V}$$

Let the constant arc length between adjacent physical fiducials, δs, equal 1, then s is simply the sequential index number of the fiducials, providing a reference for regularizing (x, y).

As any smooth curve can be approximated by polynomials of low order, Equations IV and V can be rewritten as shown in the following Equations VI and VII, respectively:

$$x(s) \approx k_0 + k_1 s + \ldots + k_m s^m = k^T \cdot \begin{pmatrix} 1 \\ s \\ \vdots \\ s^m \end{pmatrix} \qquad\text{Equation VI}$$

$$y(s) \approx l_0 + l_1 s + \ldots + l_m s^m = l^T \cdot \begin{pmatrix} 1 \\ s \\ \vdots \\ s^m \end{pmatrix} \qquad\text{Equation VII}$$

The least square fitting error is minimized as shown in the following Equation VIII:

$$\varepsilon = \sum_u (x(s_u) - \hat{x}_u)^2 + (y(s_u) - \hat{y}_u)^2 \to \min \qquad\text{Equation VIII}$$

Where: $(\hat{x}_u, \hat{y}_u)$ = measured coordinates.

Equation VIII yields the polynomial coefficient vectors $k=(k_0\ k_1\ \ldots\ k_m)^T$ and $l=(l_0\ l_1\ \ldots\ l_m)^T$. Once the parametric curve is obtained, the camera image fiducials, (x, y), can be regularized using Equations VI and VII with corresponding index numbers to provide a smoothly varying sequence of fiducial marks.

Calibration unit 124 determines a screen-to-camera mapping 452 using the set of correspondences 308, and the regularized fiducial marks generated at 217, as indicated in a block 218. The screen-to-camera mapping 452 is used to map screen domain (S) 302 to camera domain (C) 312 and vice versa. Calibration unit 124 determines the screen-to-camera mapping using the method illustrated in FIG. 2D. FIG. 2D illustrates a method for generating a mapping between two domains.

Figure 3B:
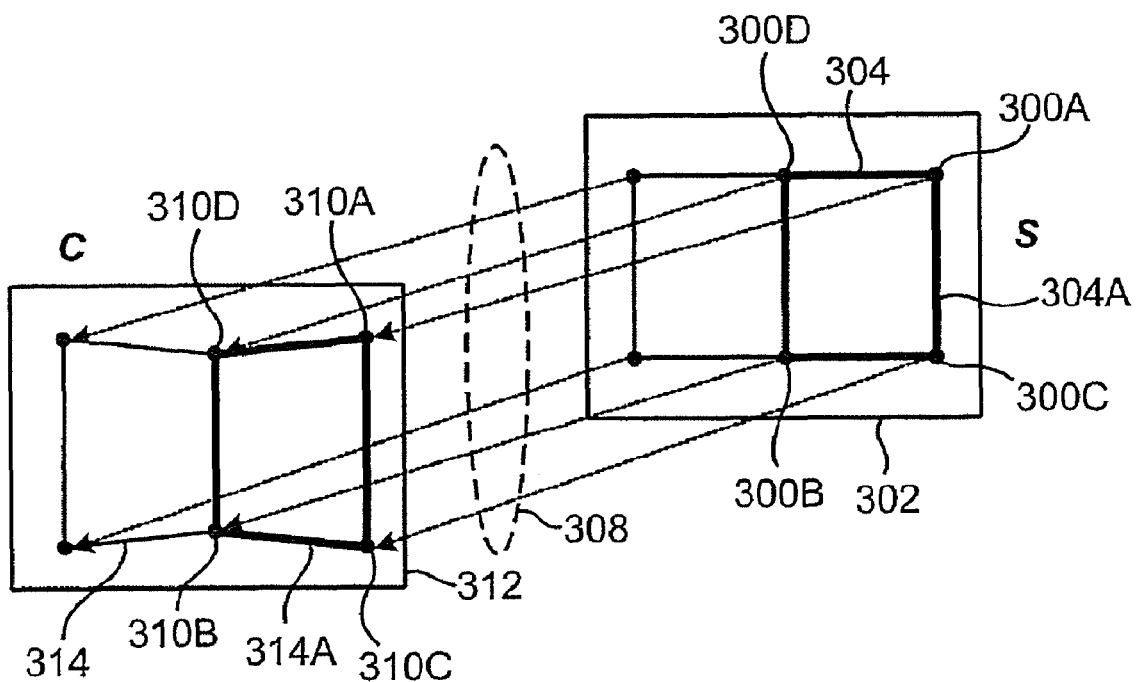

Referring to FIG. 2D and FIG. 3B, calibration unit 124 constructs a first quadrilateral mesh in a first domain and a second quadrilateral mesh in a second domain using regularized fiducial marks and a set of point correspondences between the regularized fiducial marks in the first domain and the second domain, as indicated in a block 222. In the example of FIG. 3B, calibration unit 124 constructs a quadrilateral mesh 304 in screen domain 302 by connecting points 300. Calibration unit 124 constructs a quadrilateral mesh 314 in camera domain 312 by connecting points 310 in the same way that corresponding points 300, according to point correspondences 308, are connected in screen domain 302.

Calibration unit 124 uses the set of point correspondences 308 to ensure that quadrilaterals in quadrilateral mesh 314 correspond to quadrilaterals in quadrilateral mesh 304. For example, points 300A, 300B, 300C, and 300D correspond to points 310A, 310B, 310C, and 310D as shown by the set of point correspondences 308. Accordingly, because calibration unit 124 formed a quadrilateral 304A in quadrilateral mesh 304 using points 300A, 300B, 300C, and 300D, calibration unit 124 also forms a quadrilateral 314A in quadrilateral mesh 314 using points 310A, 310B, 310C, and 310D. Quadrilateral 314A therefore corresponds to quadrilateral 304A.

Referring back to FIG. 2D, calibration unit 124 computes a mapping 452 (e.g., homographies and inverse homographies) between the first quadrilateral mesh in the first domain and the second quadrilateral mesh in the second domain, as indicated in a block 224. In one embodiment, after fiducial smoothing, a homography is computed at 224 to map from each quadrilateral in the first domain, formed by regularized fiducials, to its corresponding regularized quadrilateral in the second domain. Referring to FIG. 3B, calibration unit 124 computes a homography to map from each quadrilateral in a quadrilateral mesh 304 in screen domain 302 to its corresponding quadrilateral in a quadrilateral mesh 314 in camera domain 312.

In other embodiments, after fiducial smoothing, a homography is first computed at 224 to map from each quadrilateral in the second domain, formed by regularized fiducials, to its corresponding regularized quadrilateral in the first domain, and then the inverse of the resulting homography is computed to map from each quadrilateral in the first domain, formed by regularized fiducials, to its corresponding regularized quadrilateral in the second domain. Referring to FIG. 3B, calibration unit 124 may first compute a homography that maps each quadrilateral of a quadrilateral mesh 314 in camera domain 312 to its corresponding quadrilateral in a quadrilateral mesh 304 in screen domain 302, and then compute the inverse of the resulting homography to map from each quadrilateral in a quadrilateral mesh 304 in screen domain 302 to its corresponding quadrilateral in a quadrilateral mesh 314 in camera domain 312.

FIG. 2E illustrates a method for performing the function of block 204 of FIG. 2A. Namely, the method of FIG. 2E illustrates one embodiment of generating camera-to-projector mappings. The method of FIG. 2E will be described with reference to FIGS. 4A-4B. The method of FIG. 2E is performed for each projector 112 to generate a camera-to-projector mapping for each projector 112.

In FIG. 2E, calibration unit 124 causes a projector 112 to display a set of known pattern sequences, containing a plurality of projector fiducial marks 118C, on display surface 116, as indicated in a block 230. In one embodiment, calibration unit 124 provides a series of frames 110 with known patterns to frame buffer 113 in projector 112 by way of frame generator 108. Projector 112 displays the series of known patterns.

Camera 122 captures a set of images 123B (shown in FIG. 4A) of display surface 116 while the known patterns are being projected onto display surface 116 by projector 112 as indicated in a block 232. The known patterns may be any suitable patterns that allow calibration unit 124 to identify projector fiducial marks 118C in the patterns using images 123B captured by camera 122. For example, the known patterns may be a sequence of horizontal and vertical black-and-white bar patterns, with the intersection points of the horizontal and vertical black-and-white bars being the projector fiducial marks 118C.

Figure 4A:
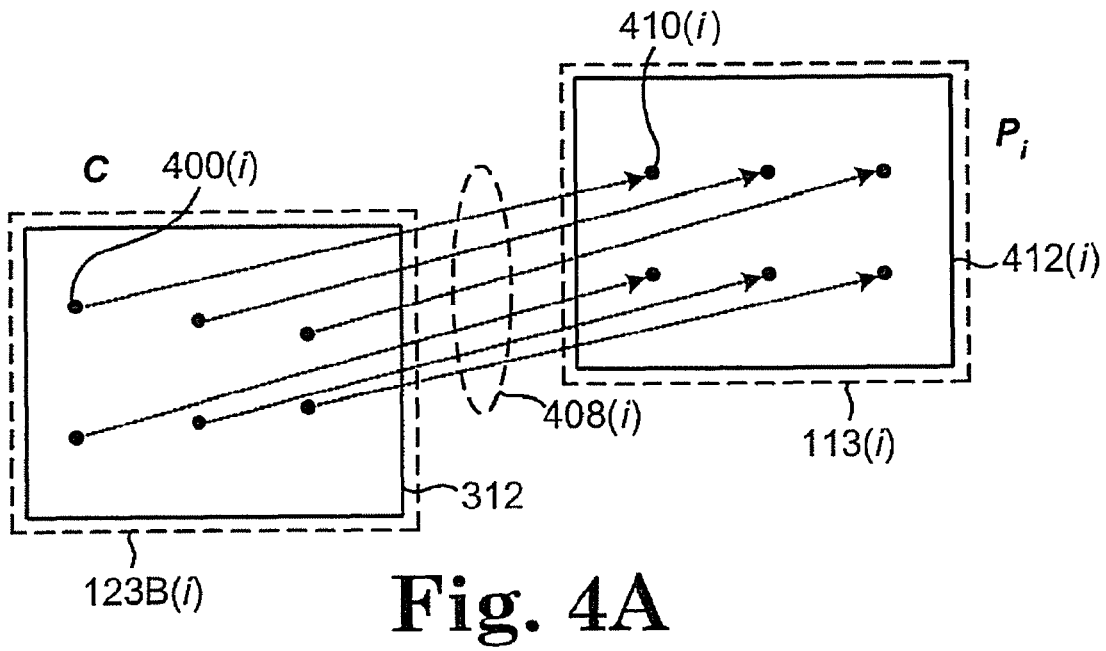
FIGS. 4A-4B are schematic diagrams illustrating the generation of camera-to-projector mappings according to one embodiment.

Calibration unit 124 locates fiducial marks of the known patterns in projector frame buffers 113 and fiducial marks of the known patterns in images 123B as indicated in a block 234. In FIG. 4A, points 410(i) represent the ith set of fiducial marks 118C (where i is an integer between 1 and N) in an ith projector domain ($P_i$) 412(i) corresponding to projector frame buffer 113(i). Points 400(i) represent the ith set of fiducial marks 118C in camera domain (C) 312 that are identified in image 123B(i) by calibration unit 124.

Referring to FIGS. 2E and 4A, calibration unit 124 generates a set of point correspondences 408(i) between an ith set of fiducial marks 118C in the known patterns (in the coordinate space of the ith projector frame buffer 113(i), i.e., points 410(i) in projector domain 412(i)), and camera image 123B(i) of these ith set of fiducial marks 118C in the known patterns, i.e., points 400(i) in camera domain 312, as indicated in a block 236. The ith set of point correspondences 408(i) are represented by arrows that identify corresponding points in camera domain 312 and projector domain 412(i).

Calibration unit 124 performs a smoothing function on an ith set of fiducial marks 118C in the known patterns in the ith projector frame buffer 113(i), i.e., points 410(i) in the projector domain 412(i), and camera images 123B(i) of these ith set of fiducial marks 118C, i.e., points 400(i) in camera domain 312, thereby generating a set of regularized projector fiducial marks having a smooth variation in spacing between adjacent projector fiducial marks, as indicated in a block 237. To remove noise introduced during fiducial mark detection both in the projector frame buffer 113(i) and camera image 123B (i), a globally smooth function, such as a polynomial surface, parameterized by the horizontal and vertical indices of the regular grids, is fitted at 237 to the fiducial marks in the projector frame buffer 113(i) and the camera image 123B(i). The geometric coordinates of these detected fiducial marks are then adjusted according to the resulting smooth function to ensure the smooth varying of the horizontal and vertical spacings between adjacent fiducial marks.

In one embodiment, in each projector frame buffer 113(i), fiducial marks derived from the known projected patterns are regular grids of points 410(i) with constant intervals in the horizontal and vertical directions. These points are projected onto the screen surface 116 and then observed by the camera 122, yielding non-regular grids of points 400(i) in the camera image 123B(i). Using the arc lengths, or in fact the index numbers, s and t, of the regular grids in both horizontal and vertical directions as parameters, a parametric polynomial surface can be fitted to the non-regular grids in the camera image as shown in the following Equations IX and X:

$$x(s,t) \approx (1 \; s \; \ldots \; s^m) \begin{pmatrix} k_{00} & \ldots & k_{0n} \\ \vdots & \ddots & \vdots \\ k_{m0} & \ldots & k_{mn} \end{pmatrix} \begin{pmatrix} 1 \\ t \\ \vdots \\ t^n \end{pmatrix} \quad \text{Equation IX}$$

$$y(s,t) \approx (1 \; s \; \ldots \; s^m) \begin{pmatrix} l_{00} & \ldots & l_{0n} \\ \vdots & \ddots & \vdots \\ l_{m0} & \ldots & l_{mn} \end{pmatrix} \begin{pmatrix} 1 \\ t \\ \vdots \\ t^n \end{pmatrix} \quad \text{Equation X}$$

The coefficient matrices, $$K = \begin{pmatrix} k_{00} & \ldots & k_{0n} \\ \vdots & \ddots & \vdots \\ k_{m0} & \ldots & k_{mn} \end{pmatrix} \text{ and } L = \begin{pmatrix} l_{00} & \ldots & l_{0n} \\ \vdots & \ddots & \vdots \\ l_{m0} & \ldots & l_{mn} \end{pmatrix},$$

Equations IX and X can be obtained by minimizing the fitting error as shown in the following Equation XI:

$$\varepsilon = \sum_u \sum_v (x(s_u, t_v) - \hat{x}_{uv})^2 + (y(s_u, t_v) - \hat{y}_{uv})^2 \to \min \quad \text{Equation XI}$$

Where:
($\hat{x}_{uv}, \hat{y}_{uv}$)=measured coordinates.

Once the parametric surface is obtained, the two-dimensional coordinates of the camera image fiducials 400(i) can be regularized according to Equations IX and X to cause the fiducials to vary smoothly.

Note that the parametric curve fitting in Equations VI and VII is merely a degenerate case of the parametric surface fitting in Equations IX and X. Parametric surface fitting can be applied to the screen fiducial marks 118A and 118B, as well as the projector fiducial marks 118C. However, in some embodiments, parametric curve fitting may be better suited for regularizing the screen fiducials since, in some implementations, there may not be enough points to constrain the surface in the vertical direction.

Calibration unit 124 determines a camera-to-projector mapping 456(i) using the set of correspondences 408(i) and the regularized projector fiducial marks generated at 237, as indicated in a block 238. The camera-to-projector mapping is used to map camera domain (C) 312 to projector domain ($P_i$) 412(i) and vice versa. Calibration unit 124 determines the camera-to-projector mapping using the method illustrated in FIG. 2D.

Figure 4B:
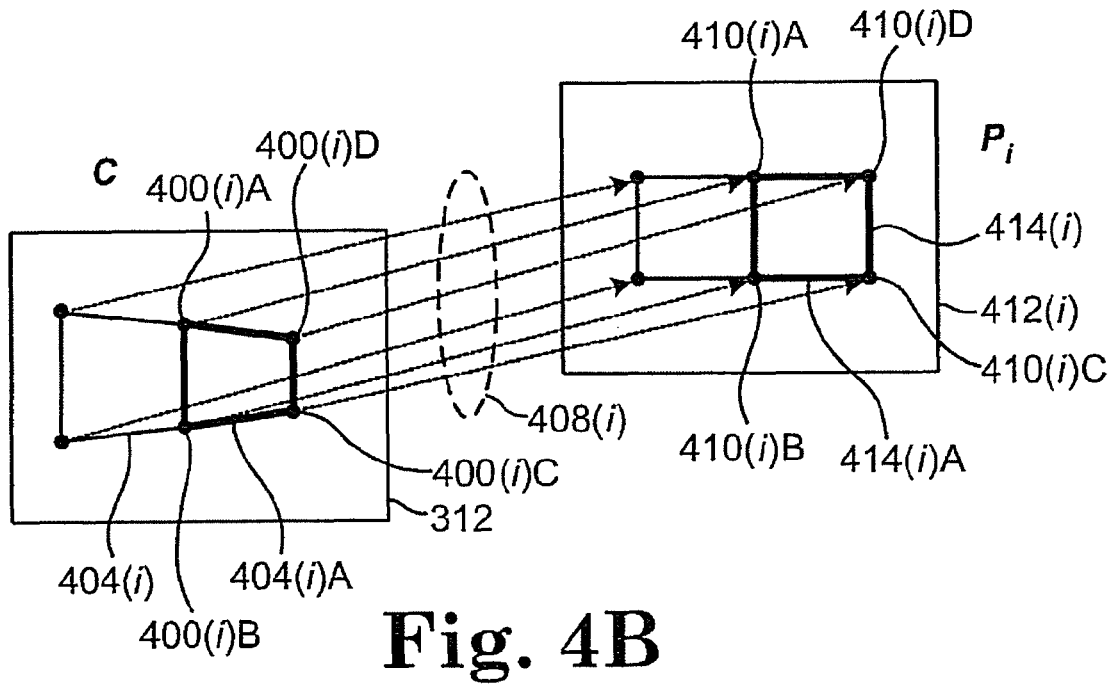

Referring to FIG. 2D and FIG. 4B, calibration unit 124 constructs a first quadrilateral mesh in a first domain and a second quadrilateral mesh in a second domain using regularized fiducial marks and a set of point correspondences between the regularized fiducial marks in the first and the second domain, as indicated in block 222. In the example of FIG. 4B, calibration unit 124 constructs a quadrilateral mesh 404(i) in camera domain 312 by connecting points 400(i). Calibration unit 124 constructs a quadrilateral mesh 414(i) in projector domain 412(i) by connecting points 410(i) in the same way that corresponding points 400(i), according to point correspondences 408(i), are connected in camera domain 312.

Calibration unit 124 uses the set of point correspondences 408(i) to ensure that quadrilaterals in quadrilateral mesh 414 (i) correspond to quadrilaterals in quadrilateral mesh 404(i). For example, points 400(i)A, 400(i)B, 400(i)C, and 400(i)D correspond to points 410(i)A, 410(i)B, 410(i)C, and 410(i)D as shown by the set of point correspondences 408(i). Accordingly, because calibration unit 124 formed a quadrilateral 404(i)A in quadrilateral mesh 404(i) using points 400(i)A, 400(i)B, 400(i)C, and 400(i)D, calibration unit 124 also forms a quadrilateral 414(i)A in quadrilateral mesh 414(i) using points 410(i)A, 410(i)B, 410(i)C, and 410(i)D. Quadrilateral 414(i)A therefore corresponds to quadrilateral 404 (i)A.

Referring back to FIG. 2D, calibration unit 124 computes a mapping 456(i) (e.g., homographies and inverse homographies) between the first quadrilateral mesh in the first domain and the second quadrilateral mesh in the second domain, as indicated in a block 224. In one embodiment, after fiducial smoothing, a homography is computed at 224 to map from each quadrilateral in the first domain, formed by regularized fiducials, to its corresponding regularized quadrilateral in the second domain. Referring to FIG. 4B, calibration unit 124 computes a homography to map from each quadrilateral in a quadrilateral mesh 404(i) in camera domain 312 to its corresponding quadrilateral in a quadrilateral mesh 414(i) in projector domain 412(i).

In other embodiments, after fiducial smoothing, a homography is first computed at 224 to map from each quadrilateral in the second domain, formed by regularized fiducials, to its corresponding regularized quadrilateral in the first domain, and then the inverse of the resulting homography is computed to map from each quadrilateral in the first domain, formed by regularized fiducials, to its corresponding regularized quadrilateral in the second domain. Referring to FIG. 4B, calibration unit 124 may first compute a homography that maps each quadrilateral of quadrilateral mesh 414(i) in projector domain 412(i) to its corresponding quadrilateral mesh 404(i) in camera domain 312, and then compute the inverse of the resulting homography to map from each quadrilateral in a quadrilateral mesh 404(i) in camera domain 312 to its corresponding quadrilateral in a quadrilateral mesh 414(i) in projector domain 412(i).

Referring back to block 206 of FIG. 2A, calibration unit 124 generates a geometric mesh 126 from the screen 116 to each projector 112 using the screen-to-camera mapping (block 202 and FIG. 2C) and camera-to-projector mapping for each projector 112 (block 204 and FIG. 2E). Each geometric mesh 126 maps screen domain (S) 302 to a projector domain ($P_i$) 412(i) and vice versa. Using the screen-to-projector meshes 126, frame generator 108 may warp frames 102 into frames 110 to geometrically correct the distortion caused by the projection of frames 110 from projector frame buffers 113 onto images 114 on the screen 116.

Figure 2F:
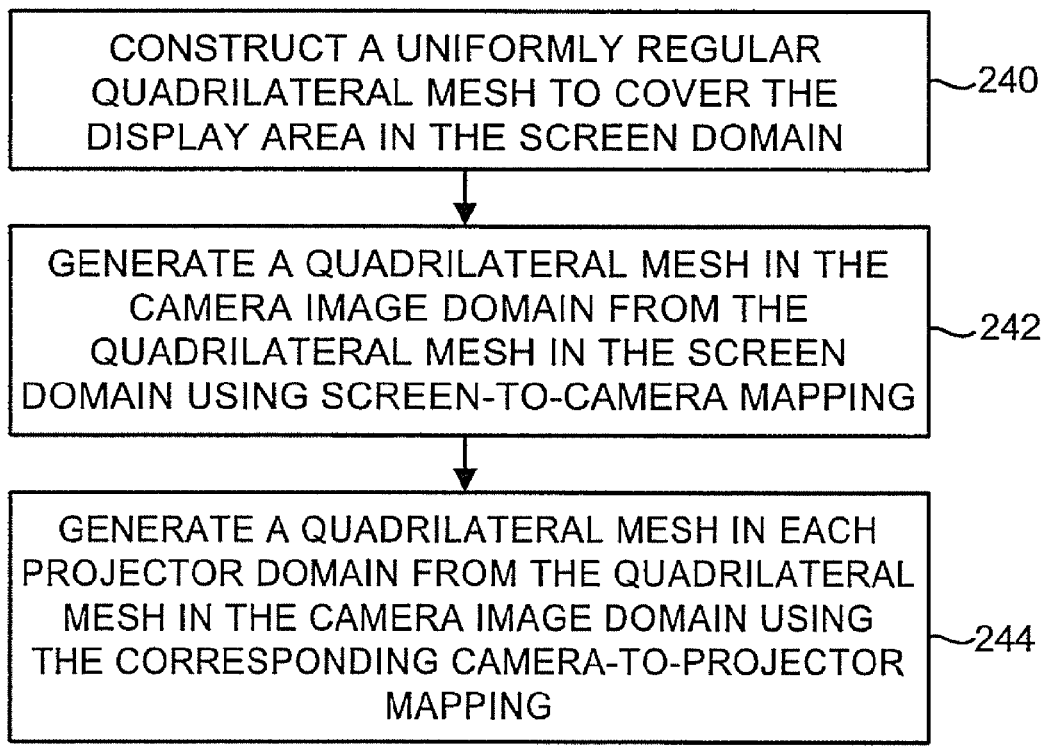
Figure 5A:
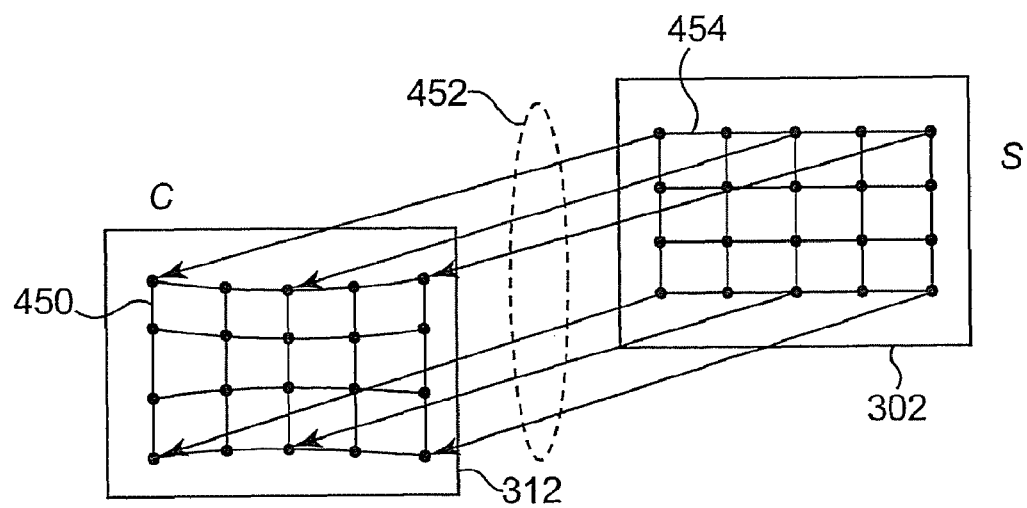
FIGS. 5A-5B are schematic diagrams illustrating the generation of screen-to-projector quadrilateral meshes according to one embodiment.

FIG. 2F illustrates a method for performing the function of block 206 of FIG. 2A. Namely, the method of FIG. 2F illustrates one embodiment of generating screen-to-projector quadrilateral meshes 126. The method of FIG. 2F will be described with reference to FIGS. 5A-5B. The method of FIG. 2F is performed for each projector 112 to generate a screen-to-projector quadrilateral mesh 126. Calibration unit 124 constructs a uniformly regular quadrilateral mesh to cover the display area in the screen domain, as indicated in a block 240. Referring to FIG. 5A, calibration unit 124 constructs a uniformly regular quadrilateral mesh 454 in the screen domain 302.

Referring back to FIG. 2F, calibration unit 124 generates a quadrilateral mesh in the camera image domain from the quadrilateral mesh in the screen domain using the screen-to-camera mapping, as indicated in a block 242. Referring to FIG. 5A, calibration unit 124 generates a quadrilateral mesh 450 in the camera image domain 312 from the quadrilateral mesh 454 in the screen domain 302 using the screen-to-camera mapping 452 generated in a block 218 of FIG. 2C.

Figure 5B:
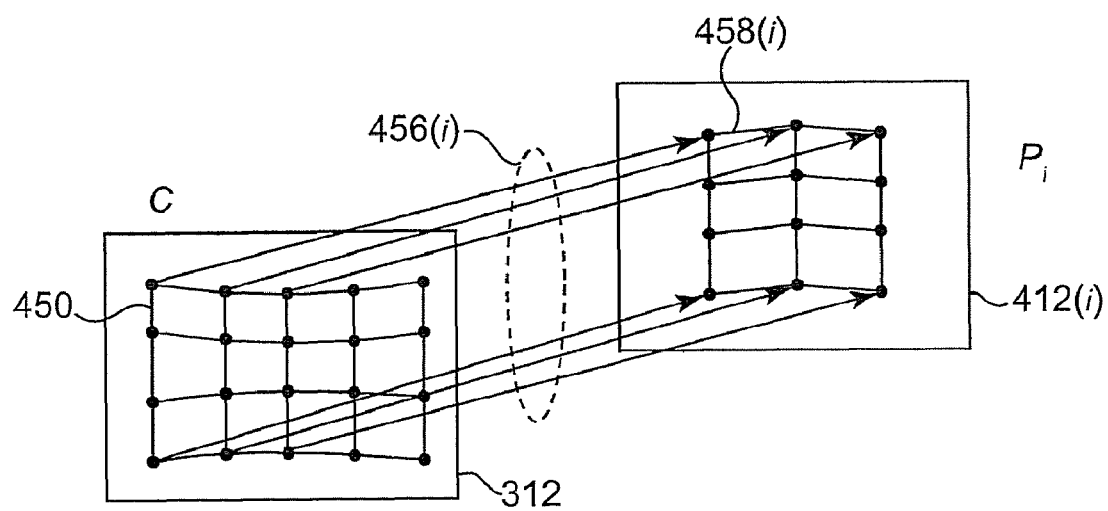

Referring back to FIG. 2F, calibration unit 124 generates a quadrilateral mesh in each projector domain from the quadrilateral mesh in the camera image domain using the corresponding camera-to-projector mapping, as indicated in a block 244. Referring to FIG. 5B, calibration unit 124 generates a quadrilateral mesh 458(i) in each projector domain 412(i) from the quadrilateral mesh 450 in the camera image domain 312 using the corresponding camera-to-projector mapping 456(i) generated in a block 238 of FIG. 2E.

Fitting a globally smooth function, such as a parametric curve or surface, to fiducials, as described above, removes noise introduced during fiducial mark detection and measurement, and helps provide precise homographic interpolation and eliminates interpolation ambiguity and various visual artifacts due to interpolation errors. This technique has the extra capability of modeling the mechanical distortions of the screen surface, thereby improving the robustness of geometric correction. Removing fiducial noise through parametric surface fitting is described in further detail in Sun, Sobel, Culbertson, Gelb, Robinson, "Calibrating Multi-Projector Cylindrically Curved Displays for 'Wallpaper' Projection", Hewlett-Packard Laboratories, PROCAMS, Aug. 10, 2008, Copyright© 2008 by the Association for Computing Machinery, Inc., which is hereby incorporated by reference herein.

The use of quadrilateral meshes according to one embodiment, as opposed to triangular meshes, enables a faster search algorithm, thereby improving the calibration speed. To perform photometric calibration according to one embodiment, calibration unit 124 accesses the geometric correction data to determine corresponding points between two domains. For example, if calibration unit 124 is given a first point in the quadrilateral mesh for a first domain, frame generator 108 will first search for a quadrilateral in the quadrilateral mesh for the first domain that contains the point. Calibration unit 124 will then identify a second quadrilateral in the quadrilateral mesh for the second domain that corresponds to the first quadrilateral for the first domain, and determine the point within the second quadrilateral that corresponds to the first point. A naïve implementation of such a search might first involve searching through all of the quadrilaterals in the first domain until a quadrilateral containing the first point is found, which could be a very time consuming process. In one embodiment, rather than performing such a naïve search technique, calibration unit 124 performs an iterative linear estimation quadrilateral search. In one form of this embodiment, calibration unit 124 performs separate row and column searches, performs a coarse estimation based on bounding boxes, iteratively adjusts the search range, and performs a strict geometric check only once or twice.

Figure 6:
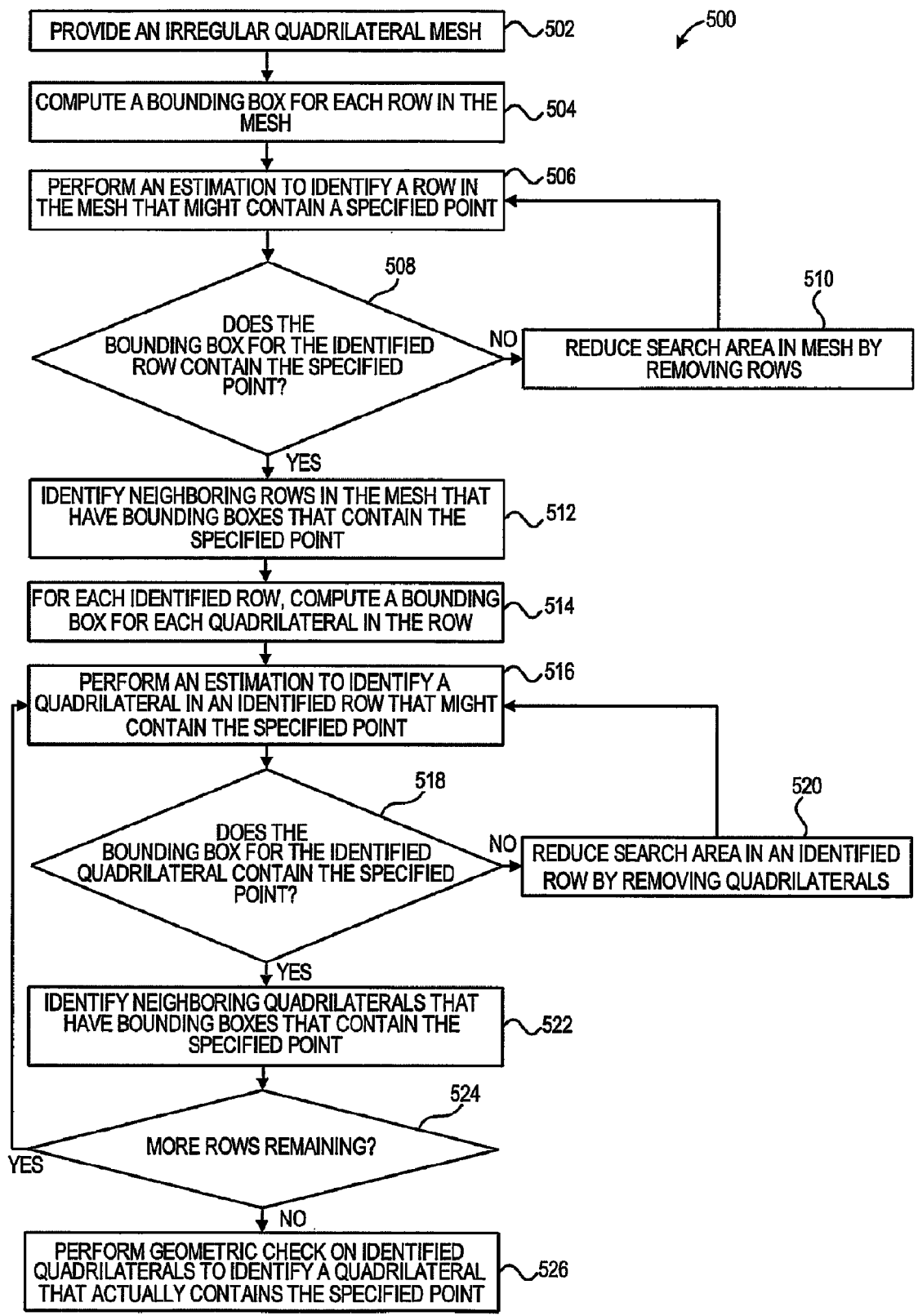
FIG. 6 is a flow diagram illustrating a method of identifying a quadrilateral containing a specified point in a quadrilateral mesh according to one embodiment.
Figure 7:
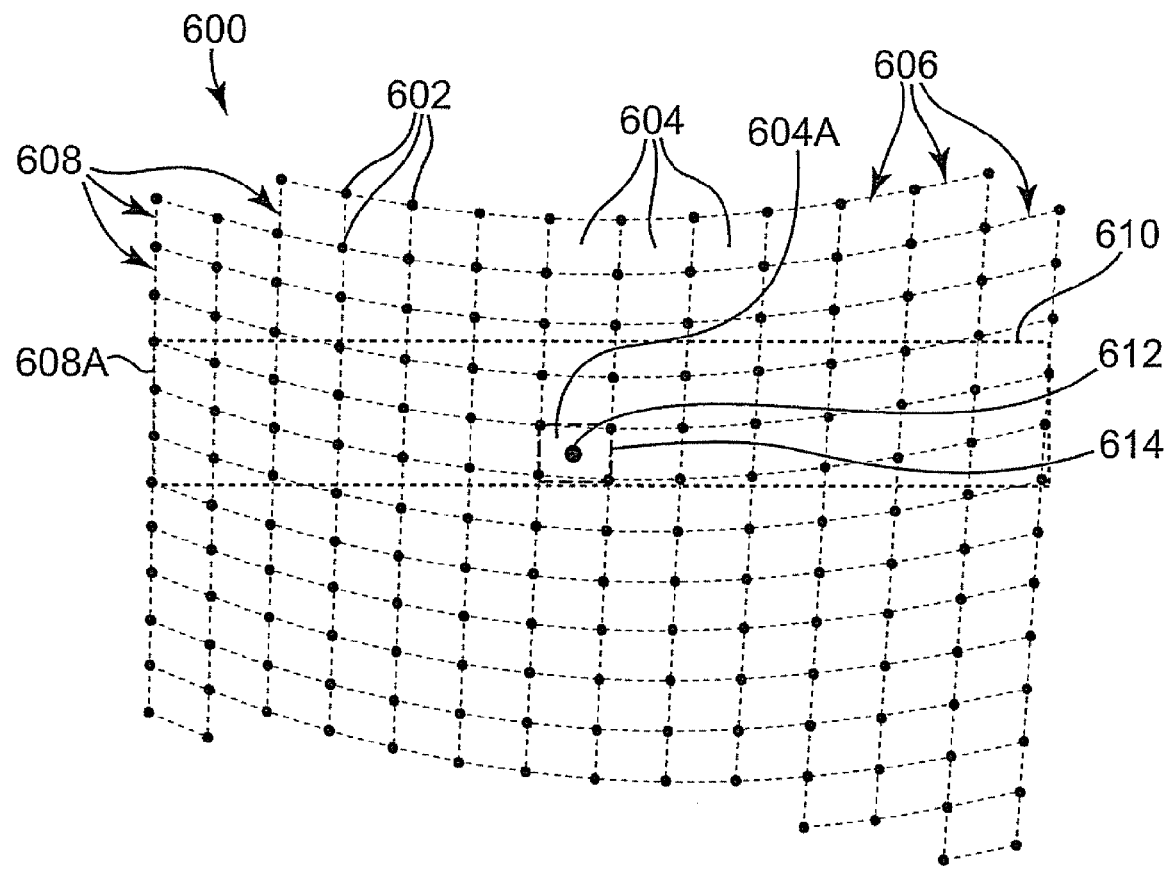
FIG. 7 is a diagram illustrating a quadrilateral mesh containing a specified point according to one embodiment.

FIG. 6 is a flow diagram illustrating a method 500 of identifying a quadrilateral containing a specified point in a quadrilateral mesh according to one embodiment. The method 500 shown in FIG. 6 will be described with further reference to FIG. 7, which is a diagram illustrating a quadrilateral mesh 600 containing a specified point 612 (x, y) according to one embodiment. Quadrilateral mesh 600 is an irregular quadrilateral mesh with a plurality of quadrilaterals 604 and an irregular grid of points 602 that correspond to the corners of the quadrilaterals. The quadrilaterals 604 are organized into a plurality of columns 606 and a plurality of rows 608. Also shown in FIG. 7 are a row bounding box 610 and a quadrilateral bounding box 614, which are described in further detail below with reference to FIG. 6 and method 500.

Referring to FIG. 6, at 502 in method 500, an irregular quadrilateral mesh 600 is provided to calibration unit 124. At 504, calibration unit 124 computes a row bounding box 610 for each row 608 in the mesh 600. In one embodiment, each bounding box 610 is larger than its corresponding row 608 of quadrilaterals 604, and completely encompasses or provides a boundary around all of the quadrilaterals 604 in the row 608 corresponding to that bounding box 610. At 506, calibration unit 124 performs an estimation to identify a row (e.g., row 608A) in the mesh 600 that might contain the specified point 612. In one embodiment, a row 608 in a mesh is numbered incrementally from top to bottom. For example, the first row from the top of a mesh 600 is numbered 0, the second row from the top of a mesh 600 is numbered 1, and so on. In one embodiment, calibration unit 124 performs the estimation at 506 using the following Equation XII:

$$\text{row} = \frac{y - top_{first}}{\frac{(bottom_{last} - top_{first})}{nRows}} \quad \text{Equation XII}$$

Where:
   row=the number of the row 608A in mesh 600 that is estimated to contain the specified point 612;
   y=y-coordinate of the specified point 612;
   $top_{first}$=y-position at the top of the bounding box 610 for the first row 608 in mesh 600;
   $bottom_{last}$=y-position at the bottom of the bounding box 610 for the last row 608 in mesh 600; and
   nRows=the total number of rows 608 in mesh 600.

At 508 in method 500, calibration unit 124 determines whether the bounding box 610 for the row 608A identified at 506 contains the specified point 612. If it is determined at 508 that the bounding box 610 for the row 608A identified at 506 does not contain the specified point 612, the method 500 moves to 510. At 510, calibration unit 124 reduces the search area in mesh 600 by removing rows 608 from the search area in mesh 600. For example, if calibration unit 124 determines at 508 that the bounding box 610 for the row 608A identified at 506 does not contain the specified point 612, and that the specified point 612 is above the bounding box 610, calibration unit 124 will discard the row 608A from the identified rows, remove the rows 608 at and below the row 608A identified at 506 from the search area, return to 506, and repeat the search process using the reduced size search area, where $bottom_{last}$ and nRows have been updated according to the new search area. If calibration unit 124 determines at 508 that the bounding box 610 for the row 608A identified at 506 does not contain the specified point 612, and that the specified point 612 is below the bounding box 610, calibration unit 124 will discard the row 608A from the set of identified rows, remove the rows 608 at and above the row 608A identified at 506 from the search area, return to 506, and repeat the search process using the reduced size search area, where $top_{first}$ and nRows have been updated according to the new search area.

If it is determined at 508 that the bounding box 610 for the row 608A identified at 506 contains the specified point 612, the method 500 moves to 512. At 512, calibration unit 124 identifies rows 608 that neighbor the row 608A identified at 506 and that have bounding boxes 610 that contain the specified point 612, and adds these rows to the set of identified rows 608A. At 514, for each row 608A identified at 506 and 512, calibration unit 124 computes a quadrilateral bounding box 614 for each quadrilateral 604 in that row 608A. In one embodiment, each quadrilateral bounding box 614 is larger than its corresponding quadrilateral 604, and completely encompasses or provides a boundary around the quadrilateral 604 corresponding to that bounding box 614. At 516, calibration unit 124 performs an estimation to identify a quadrilateral 604A in an identified row 608A that might contain the specified point 612. In one embodiment, a quadrilateral 604 in a row 608A is numbered incrementally from left to right. For example, the first quadrilateral from the left of a row 608A is numbered 0, the second quadrilateral from the left of a row 608A is numbered 1, and so on. In one embodiment, calibration unit 124 performs the estimation at 516 using the following Equation XIII:

$$\text{quad} = \frac{x - left_{first}}{\frac{(right_{last} - left_{first})}{nQuads}} \quad \text{Equation XIII}$$

Where:
   quad=the number of quadrilateral 604A in a row 608A that is estimated to contain the specified point 612;
   x=x-coordinate of the specified point 612;
   $left_{first}$=x-position at the left of the first quadrilateral 604 in a row 608A;
   $right_{last}$=x-position at the right of the last quadrilateral 604 in a row 608A; and
   nQuads=the total number of quadrilaterals 604 in a row 608A of mesh 600.

At 518 in method 500, calibration unit 124 determines whether the bounding box 614 for the quadrilateral 604A identified at 516 contains the specified point 612. If it is determined at 518 that the bounding box 614 for the quadrilateral 604A identified at 516 does not contain the specified point 612, the method 500 moves to 520. At 520, calibration unit 124 reduces the search area in a row 608A by removing quadrilaterals 604 from the search area in row 608A. For example, if calibration unit 124 determines at 518 that the bounding box 614 for the quadrilateral 604A identified at 516 does not contain the specified point 612, and that the specified point 612 is to the left of the bounding box 614, calibration unit 124 will discard the quadrilateral 604A from the set of identified quadrilaterals, remove the quadrilaterals 604 at and to the right of the quadrilateral 604A identified at 516 from the search area of row 608A, return to 516, and repeat the search process using the reduced size search area of row 608A, where $Right_{last}$ and nQuads have been updated according to the new search area of row 608A. If calibration unit 124 determines at 518 that the bounding box 614 for the quadrilateral 604A identified at 516 does not contain the specified point 612, and that the specified point 612 is to the right of the bounding box 614, calibration unit 124 will discard the quadrilateral 604A from the set of identified quadrilaterals, remove the quadrilaterals 604 at and to the left of the quadrilateral 604A identified at 516 from the search area of row 608A, return to 516, and repeat the search process using the reduced size search area of row 608A, where $left_{first}$ and nQuads have been updated according to the new search area of row 608A.

If it is determined at 518 that the bounding box 614 for the quadrilateral 604A identified at 516 contains the specified point 612, the method 500 moves to 522. At 522, calibration unit 124 identifies quadrilaterals 604 that neighbor the quadrilateral 604A identified at 516 and that have bounding boxes 614 that contain the specified point 612, and adds these quadrilaterals to the set of identified quadrilaterals 604A. At 524, calibration unit 124 determines whether there are any more of the rows 608A identified at 506 and 512 remaining to be analyzed. In one embodiment, calibration unit 124 goes through steps 516-522 for a first one of the identified rows 608A, and then repeats these steps for each of the remaining identified rows 608A. If it is determined at 524 that there are more rows 608A remaining to be analyzed, the method 500 returns to 516 to analyze the next identified row 608A.

If it is determined at 524 that there are no more rows 608A remaining to be analyzed, the method 500 moves to 526. At 526, calibration unit 124 performs a geometric check on the quadrilaterals 604A identified at 516 and 522 to identify a quadrilateral 604 that actually contains the specified point 612. In one embodiment, the geometric check performed at 526 is performed using vector geometry.

The result of method 500 according to one embodiment is to identify a quadrilateral 604 in mesh 600 that contains the specified point 612. A next step in the process would be to identify a quadrilateral in a second quadrilateral mesh that corresponds to the quadrilateral identified by method 500. A corresponding point within the identified quadrilateral in the second quadrilateral mesh would then be obtained by, for example, homographic interpolation. Method 500 according to one embodiment provides an efficient technique for quickly locating a quadrilateral in an irregular quadrilateral mesh. Locating a quadrilateral in a regular quadrilateral mesh is a simpler task, and a simplified version of method 500 can be used.

One embodiment provides a calibration unit 124 that is configured to generate at least one mesh based on images 123 of display surface 116, and perform a smoothing function (e.g., parametric surface fitting) on fiducial marks appearing in the images 123 to generate regularized fiducial marks that have a smooth variation in spacing between adjacent fiducial marks. In one embodiment, calibration unit 124 is configured to generate a geometric mapping based on the regularized fiducial marks, wherein the geometric mapping is configured to map a first domain associated with the display surface 116 to a second domain associated with a projector frame buffer 113 of a projector 112. In one embodiment, frame generator 108 is configured to generate an image frame for projection onto the display surface 116 by the projector 112 based on the geometric mapping.

Although the above methods contemplate the use of an embodiment of display system 100 with multiple projectors 112, the above methods may also be applied to an embodiment with a single projector 112. In addition, the above methods may be used to perform geometric correction on non-developable display surfaces.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method comprising:
capturing a first image of a display surface with an image capture device, the display surface having a first plurality of fiducial marks;
performing a first smoothing function on fiducial marks appearing in the first image, thereby generating a first regularized set of fiducial marks having a smooth variation in spacing between adjacent fiducial marks;
generating a first plurality of meshes based on the first regularized set of fiducial marks, the first plurality of meshes configured to map a first domain associated with the display surface to a second domain associated with the image capture device, wherein a first one of the meshes is a quadrilateral mesh formed on an irregular grid, and wherein the method further comprises:
specifying a point in the quadrilateral mesh;
computing a first plurality of bounding boxes, wherein each of the bounding boxes in the first plurality encompasses a plurality of quadrilaterals in the quadrilateral mesh; and
identifying a quadrilateral in the quadrilateral mesh that contains the specified point based at least in part on the first plurality of bounding boxes.

2. The method of claim 1, wherein the first smoothing function comprises a parametric curve fitting function.

3. The method of claim 1, and further comprising:
projecting a second plurality of fiducial marks onto the display surface with a first projector;
capturing a second image of the display surface with the image capture device; and
performing a second smoothing function on fiducial marks appearing in the second image, thereby generating a second regularized set of fiducial marks having a smooth variation in spacing between adjacent fiducial marks.

4. The method of claim 3, wherein the second smoothing function comprises a parametric surface fitting function.

5. The method of claim 3, and further comprising:
generating a second plurality of meshes based on the second regularized set of fiducial marks, the second plurality of meshes configured to map the second domain to a third domain associated with the first projector.

6. The method of claim 5, and further comprising:
generating a geometric mapping configured to map the first domain to the third domain using the first and second pluralities of meshes.

7. The method of claim 6, and further comprising:
applying the geometric mapping to render a first image frame; and
projecting the first image frame with the first projector.

8. The method of claim 5, and further comprising:
locating the second plurality of fiducial marks in the second image;
generating a set of point correspondences between the located fiducial marks in the second image and the second plurality of fiducial marks projected onto the display surface; and
determining the second plurality of meshes from the set of point correspondences.

9. The method of claim 1, further comprising:
locating the first plurality of fiducial marks in the first image;
generating a set of point correspondences between the located fiducial marks in the first image and the first plurality of fiducial marks on the display surface; and
determining the first plurality of meshes from the set of point correspondences.

10. The method of claim 1, wherein the first plurality of meshes comprise a first quadrilateral mesh associated with the first domain, and a second quadrilateral mesh associated with the second domain, the first and second quadrilateral meshes each including a plurality of quadrilaterals.

11. The method of claim 10, and further comprising:
determining a homography between each quadrilateral in the first quadrilateral mesh and a corresponding quadrilateral in the second quadrilateral mesh.

12. The method of claim 11, and further comprising:
determining an inverse homography between each quadrilateral in the first quadrilateral mesh and a corresponding quadrilateral in the second quadrilateral mesh.

13. The method of claim 1, wherein the display surface is a non-planar developable display surface.

14. The method of claim 1, and further comprising:
computing a second plurality of bounding boxes, wherein each of the bounding boxes in the second plurality encompasses a single one of the quadrilaterals in the quadrilateral mesh; and wherein identifying the quadrilateral is based at least in part on the second plurality of bounding boxes.

15. A system comprising:
a calibration unit configured to generate a mesh based on images of a display surface, the calibration unit configured to perform a smoothing function on the fiducial marks appearing in the images to generate regularized fiducial marks that have a smooth variation in spacing between adjacent fiducial marks, wherein the smoothing function is configured to remove detection and measurement noise associated with the fiducial marks;
a frame generator configured to render a first image frame using the mesh to generate a second image frame; and
a first projector configured to store the second image frame in a frame buffer and project the second image frame onto the display surface.

16. The system of claim 15, wherein the mesh defines a mapping between the display surface and the frame buffer.

17. The system of claim 15, wherein the frame generator is configured to warp the first image frame using the mesh to generate the second image frame.

18. The system of claim 15, wherein the smoothing function comprises a parametric surface fitting function.

19. A non-transitory computer-readable storage medium storing computer-executable instructions for performing a method, comprising:
performing a parametric surface fitting on fiducial marks appearing in images of a display surface, thereby generating regularized fiducial marks having smooth variations in spacing between adjacent fiducial marks, wherein parametric surface fitting is configured to remove detection and measurement noise associated with the fiducial marks;
generating a geometric mapping based on the regularized fiducial marks, the geometric mapping configured to map a first domain associated with the display surface to a second domain associated with a projector frame buffer of a projector; and
generating an image frame for projection onto the display surface by the projector based on the geometric mapping.

\* \* \* \* \*